(12) United States Patent
Taniuchi et al.

(10) Patent No.: US 9,325,042 B2
(45) Date of Patent: Apr. 26, 2016

(54) RF FRONT END MODULE AND MOBILE WIRELESS DEVICE

(71) Applicant: SONY MOBILE COMMUNICATIONS INC., Tokyo (JP)

(72) Inventors: Hirotada Taniuchi, Tokyo (JP); Hideaki Shoji, Tokyo (JP); Takaki Kanno, Tokyo (JP); Katsunori Ishimiya, Tokyo (JP)

(73) Assignees: Sony Corporation, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 65 days.

(21) Appl. No.: 14/010,019

(22) Filed: Aug. 26, 2013

(65) Prior Publication Data

US 2014/0073268 A1 Mar. 13, 2014

Related U.S. Application Data

(60) Provisional application No. 61/700,106, filed on Sep. 12, 2012.

(51) Int. Cl.
*H04B 1/44* (2006.01)
*H01P 1/10* (2006.01)
*H04B 1/00* (2006.01)
*H04B 1/525* (2015.01)

(52) U.S. Cl.
CPC ............ *H01P 1/10* (2013.01); *H04B 1/006* (2013.01); *H04B 1/525* (2013.01)

(58) Field of Classification Search
CPC .............. H04B 1/006; H04B 1/48; H04B 1/52
USPC ..................................... 455/83, 101; 333/101
See application file for complete search history.

(56) References Cited

U.S. PATENT DOCUMENTS

| | | | |
|---|---|---|---|
| 3,964,065 A * | 6/1976 | Roberts et al. ................ 342/380 |
| 6,075,996 A | 6/2000 | Srinivas |
| 6,584,304 B1 | 6/2003 | Thomsen et al. |
| 7,729,724 B2 | 6/2010 | Rofougaran et al. |
| 8,680,947 B1 * | 3/2014 | Costa et al. ................... 333/174 |
| 2002/0090974 A1 | 7/2002 | Hagn |

(Continued)

FOREIGN PATENT DOCUMENTS

EP    1 006 669 A1    6/2000

OTHER PUBLICATIONS

Extended European Search Report issued Dec. 6, 2013 in Patent Application No. 13183397.2.

(Continued)

*Primary Examiner* — Nay A Maung
*Assistant Examiner* — Angelica M Perez
(74) *Attorney, Agent, or Firm* — Oblon, McClelland, Maier & Neustadt, L.L.P.

(57) ABSTRACT

A wireless communication module comprising including a first transmission bandpass filter that takes a first transmit frequency band as a passband; a second transmission bandpass filter that takes a second transmit frequency band as a passband; a first reception bandpass filter that takes a first receive frequency band as a passband; a second reception bandpass filter that takes a second receive frequency band as a passband; and a plurality of switches, each switch connected to a single one of the bandpass filters.

18 Claims, 20 Drawing Sheets

(56) References Cited

U.S. PATENT DOCUMENTS

| | | |
|---|---|---|
| 2003/0214373 A1 | 11/2003 | Andricacos et al. |
| 2009/0093270 A1 | 4/2009 | Block et al. |
| 2014/0035700 A1* | 2/2014 | Zeng et al. .................. 333/132 |
| 2015/0018043 A1 | 1/2015 | Taniuchi et al. |

OTHER PUBLICATIONS

Office Action issued Feb. 18, 2015 in European Patent Application No. 13183397.2.

* cited by examiner

FIG. 9

| # | OPERATING FREQUENCY BAND | SW#1 (11a) | SW#2 (11b) | SW#3 (12a) | SW#4 (12b) | SW#5 (13) | SW#6 (14) |
|---|---|---|---|---|---|---|---|
| 1 | B#1 | OFF | OFF | OFF | ON | OFF | ON |
| 2 | B#2 | ON | OFF | OFF | OFF | ON | OFF |
| 3 | B#1Rx+B#2Rx, B#1Tx | OFF | ON | OFF | ON | OFF | ON |
| 4 | B#1Rx+B#2Rx, B#2Tx | ON | OFF | ON | OFF | ON | OFF |
| 5 | B#1 unused, B#2 unused | OFF | OFF | OFF | OFF | OFF | OFF |

FIG. 11

| # | OPERATING FREQUENCY BAND | SW#1 (11a) | SW#2 (11b) | SW#3 (11c) | SW#4 (12a) | SW#5 (12b) | SW#6 (12c) | SW#7 (13a) | SW#8 (13b) | SW#9 (13c) | SW#10 (14) | SW#11 (15) | SW#12 (16) |
|---|---|---|---|---|---|---|---|---|---|---|---|---|---|
| 1 | B#1 | OFF | OFF | OFF | OFF | OFF | OFF | OFF | OFF | ON | OFF | OFF | ON |
| 2 | B#2 | OFF | OFF | OFF | OFF | ON | OFF | OFF | OFF | OFF | OFF | ON | OFF |
| 3 | B#3 | ON | OFF | OFF | OFF | OFF | OFF | OFF | OFF | OFF | ON | OFF | OFF |
| 4 | B#1Rx+B#2Rx, B#1Tx | OFF | OFF | OFF | OFF | OFF | ON | OFF | ON | OFF | OFF | OFF | ON |
| 5 | B#1Rx+B#3Rx, B#1Tx | OFF | OFF | ON | OFF | OFF | OFF | OFF | OFF | ON | OFF | OFF | ON |
| 6 | B#1Rx+B#2Rx, B#2Tx | OFF | OFF | OFF | OFF | ON | OFF | OFF | ON | OFF | OFF | ON | OFF |
| 7 | B#2Rx+B#3Rx, B#2Tx | OFF | ON | OFF | OFF | ON | OFF | OFF | OFF | OFF | OFF | ON | OFF |
| 8 | B#1Rx+B#3Rx, B#3Tx | ON | OFF | OFF | OFF | OFF | OFF | ON | OFF | OFF | ON | OFF | OFF |
| 9 | B#2Rx+B#3Rx, B#3Tx | ON | OFF | OFF | ON | OFF | OFF | OFF | OFF | OFF | ON | OFF | OFF |
| 10 | B#1Rx+B#2Rx+B#3Rx, B#1Tx | OFF | OFF | ON | OFF | OFF | ON | OFF | OFF | ON | OFF | OFF | ON |
| 11 | B#1Rx+B#2Rx+B#3Rx, B#2Tx | OFF | ON | OFF | OFF | ON | OFF | OFF | ON | OFF | OFF | ON | OFF |
| 12 | B#1Rx+B#2Rx+B#3Rx, B#3Tx | ON | OFF | OFF | ON | OFF | OFF | ON | OFF | OFF | ON | OFF | OFF |
| 13 | B#1 unused, B#2 unused, B#3 unused | OFF | OFF | OFF | OFF | OFF | OFF | OFF | OFF | OFF | OFF | OFF | OFF |

FIG. 13

| # | OPERATING FREQUENCY BAND | SW#1 (11a) | SW#2 (11b) | SW#3 (12a) | SW#4 (12b) | SW#5 (13a) | SW#6 (14) | SW#7 (15) | SW#8 (16) |
|---|---|---|---|---|---|---|---|---|---|
| 1 | B#1 | OFF | OFF | OFF | OFF | ON | OFF | OFF | ON |
| 2 | B#2 | OFF | OFF | ON | OFF | OFF | OFF | ON | OFF |
| 3 | B#3 | ON | OFF | OFF | OFF | OFF | ON | OFF | OFF |
| 4 | B#1Rx+B#2Rx, B#1Tx | OFF | OFF | OFF | ON | ON | OFF | OFF | ON |
| 5 | B#1Rx+B#3Rx, B#1Tx | OFF | ON | OFF | OFF | ON | OFF | OFF | ON |
| 6 | B#1Rx+B#2Rx+B#3Rx, B#1Tx | OFF | ON | OFF | ON | ON | OFF | OFF | ON |
| 7 | B#1 unused, B#2 unused, B#3 unused | OFF | OFF | OFF | OFF | OFF | OFF | OFF | OFF |

FIG. 16

| # | OPERATING FREQUENCY BAND | SW#1 (11a) | SW#2 (11b) | SW#3 (12) | SW#4 (13) | SW#5 (14) |
|---|---|---|---|---|---|---|
| 1 | B#1 | OFF | OFF | ON | OFF | ON |
| 2 | B#2Rx2, B#2Tx | ON | OFF | OFF | ON | OFF |
| 3 | B#1Rx+B#2Rx1, B#1Tx | OFF | ON | ON | OFF | ON |
| 4 | B#1 unused, B#2 unused | OFF | OFF | OFF | OFF | OFF |

FIG. 18

| # | OPERATING FREQUENCY BAND | SW#1 (11a) | SW#2 (11b) | SW#3 (12a) | SW#4 (12b) | SW#5 (13) | SW#6 (14) |
|---|---|---|---|---|---|---|---|
| 1 | B#1Rx1, B#1Tx | OFF | OFF | OFF | ON | OFF | ON |
| 2 | B#2Rx2, B#2Tx | ON | OFF | OFF | OFF | ON | OFF |
| 3 | B#1Rx1+B#2Rx1, B#1Tx | OFF | ON | OFF | ON | OFF | ON |
| 4 | B#1Rx2+B#2Rx2, B#2Tx | ON | OFF | ON | OFF | ON | OFF |
| 5 | B#1 unused, B#2 unused | OFF | OFF | OFF | OFF | OFF | OFF |

FIG. 20

| # | OPERATING FREQUENCY BAND | SW#1 (11) | SW#2 (12) | SW#3 (13) | SW#4 (14) |
|---|---|---|---|---|---|
| 1 | B#1Rx1, B#1Tx | OFF | OFF | OFF | ON |
| 2 | B#2Rx1, B#2Tx | OFF | ON | OFF | OFF |
| 3 | B#1Rx1+B#2Rx2, B#1Tx | ON | OFF | OFF | ON |
| 4 | B#1Rx2+B#2Rx1, B#2Tx | OFF | ON | ON | OFF |
| 5 | B#1 unused, B#2 unused | OFF | OFF | OFF | OFF |

RF FRONT END MODULE AND MOBILE WIRELESS DEVICE

CROSS REFERENCE TO RELATED APPLICATIONS

This application is related to and claims priority under 35 U.S.C. §119(e) to Provisional Application Ser. No. 61/700,106, filed Sep. 12, 2012, the contents of which are hereby incorporated herein by reference.

BACKGROUND

1. Field

The present specification relates to an RF frontend module that conducts mobile communication, and to a mobile wireless device equipped therewith.

2. Description of the Related Art

With conventional mobile communication formats implementing FDD (Frequency Division Duplexing), which simultaneously transmits and receives by dividing the frequency region in use into transmit and receive portions, the uplink (UL) frequency band and the downlink (DL) frequency band are locked as a pair. RF frontends utilized for FDD are disclosed in PTL 1 and 2. Examples of such conventional mobile communication formats include UMTS (Universal Mobile Telecommunications System) and FDD-LTE (Frequency-Division Duplexing-Long Term Evolution).

FIG. 1 illustrates examples for three paired frequency bands (pair bands) B1, B3, and B4 as examples of pair bands for FDD. Each pair band is a combination of a transmit (Tx) frequency band corresponding to uplink, and a receive (Rx) frequency band corresponding to downlink.

Meanwhile, a technology called carrier aggregation (CA) has been introduced since LTE-Advanced. Carrier aggregation is a technology that attempts to combine multiple frequency carriers to improve bandwidth and communication speed. This technology includes inter-band carrier aggregation, a form of operation in which a transmit (Tx) frequency band and a receive (Rx) frequency band constituting one of the pair bands illustrated in FIG. 1 are combined with another frequency band, for example.

Combining multiple frequency bands in this way not only enables a wider frequency band to be procured, but also makes asymmetric UL/DL operation possible by bundling distant or isolated frequency bands together, and has the advantage of enabling effective frequency band utilization.

FIG. 2 illustrates an exemplary configuration of an existing RF frontend module compatible with inter-band carrier aggregation.

The RF frontend module 50, disposed between an antenna 101 and an RF transceiver 200, is a unit that performs actions such as filtering out-of-band RF signals and selecting a filter. Internally, the RF frontend module 50 includes a switch unit 10, a diplexer 20, and duplexers 31 to 34 (DUP#1 to DUP#4). The switch unit 10 includes RF switches 11 to 13.

The RF switch 11 is disposed between the diplexer 20 and the antenna 101, and is switched on/off to connect or break the path therebetween. The RF switch 12 is disposed between the duplexer 33 and the antenna 101, and is switched on/off to connect or break the path therebetween. The RF switch 13 is disposed between the duplexer 34 and the antenna 101, and is switched on/off to connect or break the path therebetween.

The diplexer 20 functions to split the frequency band in use between both the duplexer 31 and the duplexer 32.

Since transmitting and receiving are conducted simultaneously with FDD, each of the duplexers 31 to 34 function to provide isolation between the transmit (Tx) frequency band and the receive (Rx) frequency band in a pair so that the transmit (Tx) signal and the receive (Rx) signal do not interfere with each other. As illustrated in FIG. 3, the duplexer 31, for example, is composed of a band-pass filter 312 that selectively passes signals in the transmit (Tx) frequency band, a band-pass filter 313 that selectively passes signals in the receive (Rx) frequency band, and a phase circuit (phase shifter) 311 connected in series to the band-pass filter 313. The phase circuit 311 is configured (designed) with matching circuit and line length settings such that the relationship between the frequency characteristics of the filters is appropriate. Thus, transmit signals or other unwanted signals do not enter the receiving end and good separation between transmit and receive signals is achieved. The matching circuit typically may be composed of inductors and/or capacitors.

Returning to FIG. 2, the RF transceiver 200 includes power amps 211 to 214 respectively connected to the duplexers 31 to 34. The input terminals of the power amps 211 to 214 are the respective transmit ports #1 to #4 of an existing transmitter circuit (not illustrated) inside the RF transceiver 200. The RF transceiver 200 also includes receive ports #1 to #4 respectively connected to the duplexers 31 to 34. Connected to the receive ports #1 to #4 is an existing receiver circuit (not illustrated) that includes low-noise amplifiers (LNAs) 221 to 224.

FIG. 4 is a graph for explaining duplexer operation. The horizontal axis of the graph represents frequency (MHz), while the vertical axis represents attenuation (dB). The waveform Wt illustrates frequency characteristics that indicate how a signal proceeding from a transmit port to an antenna terminal attenuates in a duplexer, while the waveform Wr expresses frequency characteristics that indicate how a signal proceeding from an antenna terminal to a receive port attenuates in a duplexer.

The area A1 portion of the waveform Wt indicates low insertion loss in the transmit frequency band, and indicates that the transmit power efficiency is good. The area A2 portion of the waveform Wr indicates low insertion loss in the receive frequency band, and indicates that the receive sensitivity is good.

Also, the area A3 portion of the waveform Wr indicates that the looping of transmit signals from the duplexer to the receiving end is suppressed, and that receive sensitivity loss due to transmit signals is suppressed. Similarly, the area A4 portion of the waveform Wt indicates that the duplexer is suppressing losses in receive sensitivity due to noise originating from a power amp entering the receiving end.

In the case of utilizing a single band pair (one transmit frequency band and one receive frequency band) given the configuration in FIG. 2, the switch 12 leading to the duplexer #3 connected to the transmit port #3 and the receive port #3 is switched on while the other switches are switched off, for example. Alternatively, the switch 13 leading to the duplexer #4 connected to the transmit port #4 and the receive port #4 is switched on while the other switches are switched off.

In the case of operating inter-band carrier aggregation with two downlinks (2DL) and one uplink (1UL) given the configuration in FIG. 2, the switch 11 leading to the diplexer 20 is switched on while the other switches are switched off. At this point, the transmit port #1 is utilized for transmitting while the receive ports #1 and #2 are utilized for receiving, for example.

CITATION LIST

Patent Literature

[PTL 1] U.S. Pat. No. 7,729,724
[PTL 2] U.S. Patent Application Publication No. 2002/0090974

However, with a conventional RF frontend module configuration like the above, inter-band carrier aggregation is limited to combinations of frequency bands that can be separated by a diplexer. Additionally, there is a problem in that as inter-band carrier aggregation combinations increase, the configuration of the RF frontend module becomes more complicated due to combining multiple diplexers, for example. In other words, in the case of using diplexers, inter-band carrier aggregation is only realized for combinations of frequency bands that can be separated by those diplexers. Also, although it is possible to use diplexers for combinations of frequency bands having distant frequencies, combinations of nearby frequencies are difficult. This is because with the multilayer filter used in a diplexer, the attenuation/frequency relationship from the passband to the attenuation band is gradual (not steep).

Moreover, by using a diplexer, the properties of the RF frontend module worsen to an extent equivalent to the insertion loss.

Also, as FIG. 4 demonstrates, with an RF frontend module that uses a diplexer, it is difficult to sufficiently attenuate a signal in the region outside the passband, and there is a trade-off between reducing insertion loss in the passband and obtaining sufficient attenuation in the region outside the passband.

Since the transmit and receive pair band is statically determined with conventional FDD, it has been sufficient to concentrate attenuation in the relevant frequency bands corresponding to the pair band. However, with inter-band carrier aggregation, transmit signals arrive in frequency bands other than the pair band, and thus attenuation must be ensured for multiple frequency bands. As a result, there are problems of difficult duplexer design, larger size, and increased insertion loss in the passband.

The present specification has been devised in light of such a background, and the inventor has recognized the need to provide an FDD RF frontend module able to realize, with a simple configuration, inter-band carrier aggregation with little additional insertion loss.

BRIEF SUMMARY

An FDD RF frontend module according to an embodiment is provided with a first transmission bandpass filter that takes a first transmit frequency band as a passband, a second transmission bandpass filter that takes a second transmit frequency band as a passband, a first reception bandpass filter that takes a first receive frequency band as a passband, a second reception bandpass filter that takes a second receive frequency band as a passband, first to fifth RF switches, a first phase circuit that, by means of the first RF switch, is selectively connected between the second reception bandpass filter and the antenna terminal, a second phase circuit that, by means of the second RF switch, is selectively connected between the second reception bandpass filter and the antenna terminal, and a third phase circuit that, by means of the third RF switch, is selectively connected between the first reception bandpass filter and the antenna terminal wherein the second transmission bandpass filter and the antenna terminal are selectively connected by means of the fourth RF switch, the first transmission bandpass filter and the antenna terminal are selectively connected by means of the fifth RF switch, and the FDD RF frontend module operates in an operating mode from among a first operating mode in which the third and fifth RF switches are switched on while the other RF switches are switched off, a second operating mode in which the first and fourth RF switches are switched on while the other RF switches are switched off, and a third operating mode in which the second, third, and fifth RF switches are switched on while the other RF switches are switched off.

The first phase circuit is configured to block transmit signals passing through the second transmission bandpass filter from looping back into the receiving end, and the second phase circuit is configured to block transmit signals passing through the first transmission bandpass filter from looping back into the receiving end.

In the above RF frontend module, there may be additionally provided a fourth phase circuit that, by means of the fourth RF switch, is selectively connected between the second transmission bandpass filter and the antenna terminal, and a fifth phase circuit that, by means of the fifth RF switch, is selectively connected between the first transmission bandpass filter and the antenna terminal.

In the above RF frontend module, it may also be configured such that two filters which have the same passband but different attenuation properties are included as the second reception bandpass filter, the two filters being respectively selected when used in combination with the corresponding first or second transmission bandpass filter.

In the above RF frontend module, it may also be configured such that a specific reception bandpass filter, the phase circuit connected thereto, and its corresponding transmission bandpass filter are constructed with a duplexer, a single RF switch is provided with respect to the duplexer, and the single RF switch is shared between the relevant reception bandpass filter and transmission bandpass filter.

A mobile wireless device according to the embodiment is provided with an FDD RF frontend module connected to an antenna, an RF transceiver that is connected to the RF frontend module, includes a transmitter circuit and a receiver circuit, and conducts high-frequency signal transmit/receive processing, and a baseband processor that is connected to the RF transceiver and conducts baseband processing, wherein the RF frontend module is provided with a first transmission bandpass filter that takes a first transmit frequency band as a passband, a second transmission bandpass filter that takes a second transmit frequency band as a passband, a first reception bandpass filter that takes a first receive frequency band as a passband, a second reception bandpass filter that takes a second receive frequency band as a passband, first to fifth RF switches, a first phase circuit that, by means of the first RF switch, is selectively connected between the second reception bandpass filter and the antenna terminal, a second phase circuit that, by means of the second RF switch, is selectively connected between the second reception bandpass filter and the antenna terminal, and a third phase circuit that, by means of the third RF switch, is selectively connected between the first reception bandpass filter and the antenna terminal, wherein the second transmission bandpass filter and the antenna terminal are selectively connected by means of the fourth RF switch, the first transmission bandpass filter and the antenna terminal are selectively connected by means of the fifth RF switch, and the baseband processor causes the RF frontend module to operate in an operating mode from among a first operating mode in which the third and fifth RF switches are switched on while the other RF switches are switched off, a second operating mode in which the first and fourth RF switches are switched on while the other RF switches are switched off, and a third operating mode in which the second, third, and fifth RF switches are switched on while the other RF switches are switched off.

According to an embodiment, there is provided an FDD RF frontend module able to realize, with a simple configuration, inter-band carrier aggregation with little additional insertion loss.

BRIEF DESCRIPTION OF THE DRAWINGS

FIG. 9 is a diagram illustrating the operating frequencies and the on/off states of six RF switches (SW#1 to SW#6) for each of five operating modes of the RF frontend module in FIG. 8.

FIG. 11 is a diagram illustrating the operating frequencies and the on/off states of twelve RF switches (SW#1 to SW#12) for each of thirteen operating modes of the RF frontend module in FIG. 10.

FIG. 13 is a diagram illustrating the operating frequencies and the on/off states of eight RF switches (SW#1 to SW#8) for each of seven operating modes of the RF frontend module in FIG. 12.

FIG. 16 is a diagram illustrating the operating frequencies and the on/off states of five RF switches (SW#1 to SW#5) for each of four operating modes of the RF frontend module in FIG. 14.

FIG. 18 is a diagram illustrating the operating frequencies and the on/off states of six RF switches (SW#1 to SW#6) for each of five operating modes of the RF frontend module in FIG. 17.

FIG. 20 is a diagram illustrating the operating frequencies and the on/off states of four RF switches (SW#1 to SW#4) for each of five operating modes of the RF frontend module in FIG. 19.

DETAILED DESCRIPTION

Hereinafter, an embodiment will be described in detail.

Figure 5:
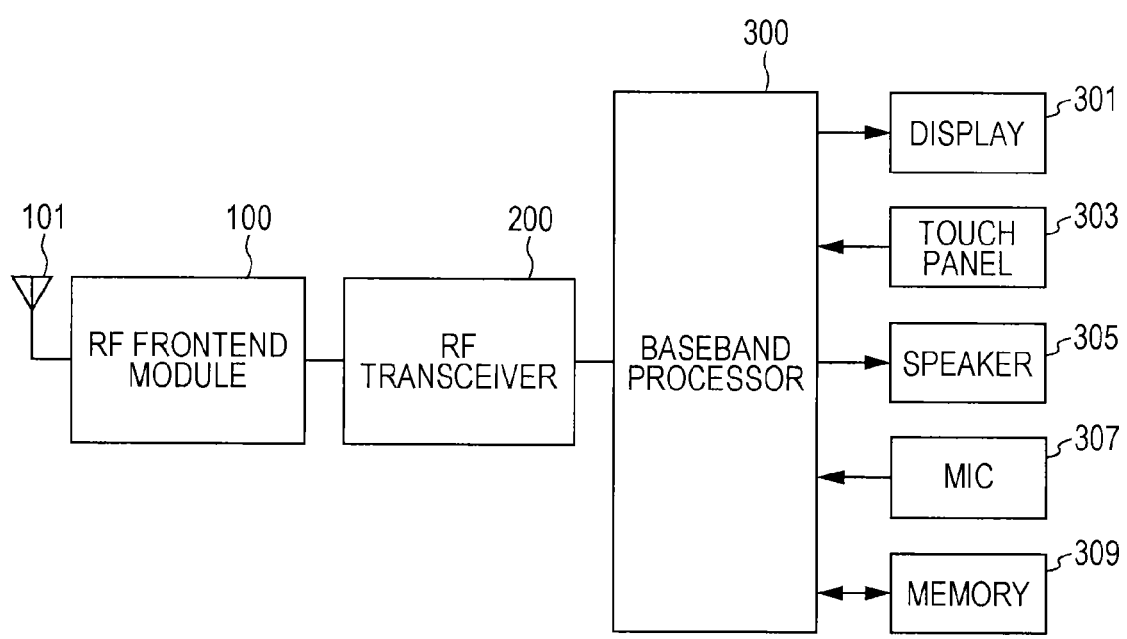
FIG. 5 is a block diagram illustrating an exemplary configuration of a mobile wireless device implementing an RF frontend module of an embodiment.

FIG. 5 is a block diagram illustrating an exemplary configuration of a mobile wireless device implementing an RF frontend module of the embodiment. The elements illustrated in FIG. 5 indicate a basic configuration for a mobile wireless device like those referred to as smartphones. Elements other than those illustrated may also be included. The mobile wireless device is not limited to smartphones, and may include arbitrary apparatus with wireless communication functions utilizing an RF frontend module.

The mobile wireless device is provided with an antenna 101, an RF frontend module 100, an RF transceiver 200, a baseband processor 300, a display 301, a touch panel 303, a speaker 305, a microphone (mic) 307, and memory 309.

The antenna 101 is a component for transmitting and receiving radio waves in frequency bands used by the mobile wireless device. Although a single antenna is illustrated in the drawing, multiple antennas may also be provided.

The RF frontend module 100, disposed between the antenna 101 and the RF transceiver 200, is a unit that performs actions such as filtering out-of-band RF signals and selecting a filter. Further details will be described later.

The RF transceiver 200 has a transmitter circuit including components such as a power amp, a receiver circuit including a low-noise amp, and an oscillator, etc, and conducts high-frequency signal transmit and receive processing.

The baseband processor 300 includes a processor or other processing unit that performs digital signal processing on baseband signals, and executes processes required by the mobile wireless device and control over respective units. The baseband processor 300 also functions as a controller that switches various RF switches inside the RF frontend module 100 on/off, causing the RF frontend module to operate in one of multiple operating modes.

The display 301 is connected to the baseband processor 300 and includes a display device that provides the user with a display interface.

The touch panel 303 is ordinarily provided jointly with the display 301, is connected to the baseband processor 300, and includes a touch input device that provides the user with an input interface.

The speaker 305 is a component that converts audio signals provided by the baseband processor 300 into sound waves. The microphone (mic) 307 is a component that converts sound waves into corresponding electric signals and inputs them into the baseband processor 300.

The memory 309 is a storage apparatus used as a storage area and work area for components such as the processor in the baseband processor 300.

The RF frontend module 100 may be configured in a unified manner as an integrated circuit, or as separate parts.

Figure 6:
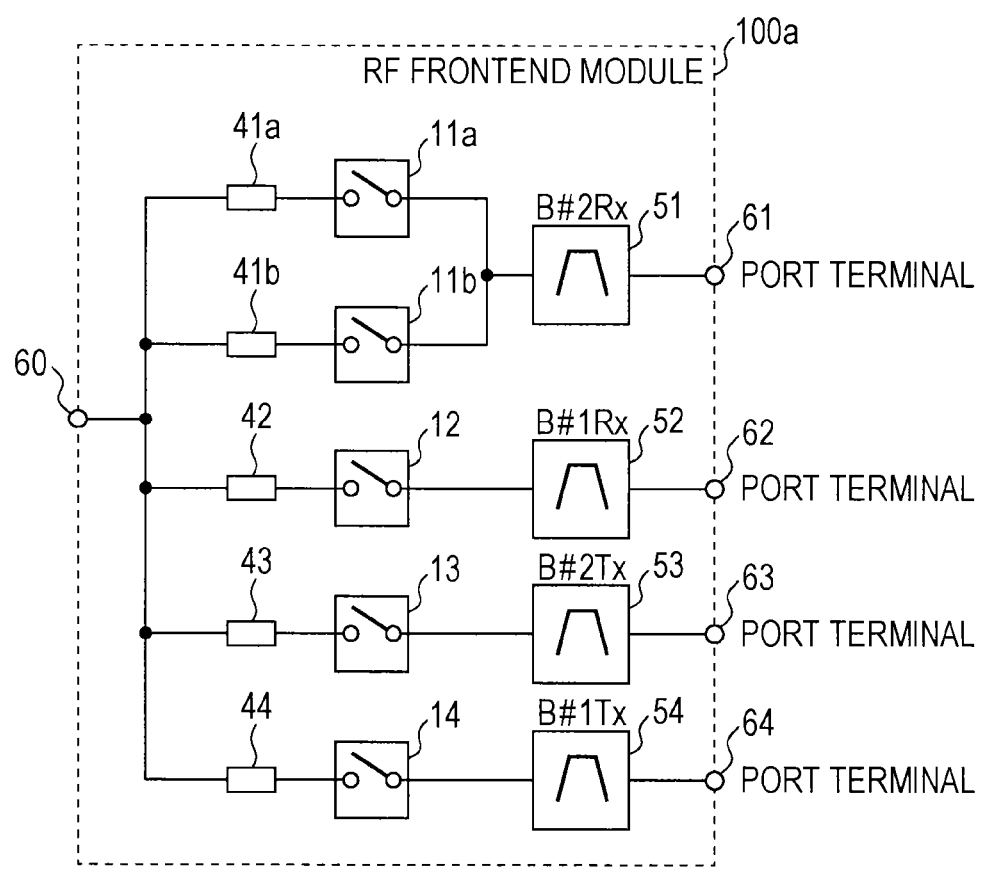
FIG. 6 is a block diagram illustrating a basic configuration of an RF frontend module according to an embodiment.

FIG. 6 illustrates a basic configuration of an RF frontend module according to the embodiment. The RF frontend module 100a includes an antenna terminal 60, and port terminals 61 to 64. The respective port terminal functions as receiver terminals #1 and #2 connected to a receiver circuit, or transmitter terminals #1 and #2 connected to a transmitter circuit.

The antenna terminal 60 is connected to one end of respective phase circuits 41a, 41b, 42, 43, and 44. The other ends of these phase circuits 41a, 41b, 42, 43, and 44 are respectively connected to one end of RF switches 11a, 11b, 12, 13, and 14. Additionally, the other ends of the RF switches 11a and 11b are jointly connected to one end of a bandpass filter (BPF) 51, while the other ends of the RF switches 12, 13, and 14 are respectively connected to one end of bandpass filters 52, 53, and 53. The other ends of the bandpass filters 51, 52, 53, and 54 are respectively connected to the port terminals 61, 62, 63, and 64.

The bandpass filter 52 treats a first frequency band (the receive frequency band of the pair band B#1) as a passband, while the bandpass filter 51 treats a second frequency band (the receive frequency band of the pair band B#2) as a passband. The bandpass filter 54 treats a third frequency band (the transmit frequency band of the pair band B#1) as a passband, while the bandpass filter 53 treats a fourth frequency band (the transmit frequency band of the pair band B#2) as a passband.

In this embodiment, a first and a second phase circuit (in this example, the phase circuits 41a and 41b) are connected to at least one bandpass filter (in this example, the bandpass filter 51) via respective RF switches (in this example, the RF switches 11a and 11b).

Figure 3:
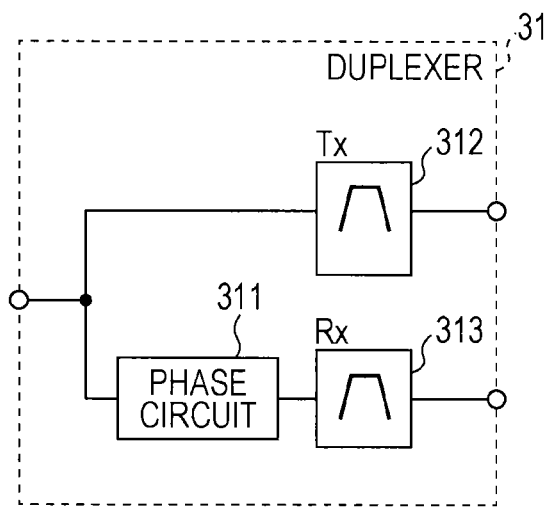
FIG. 3 is a diagram illustrating an exemplary configuration of a duplexer.
Figure 4:
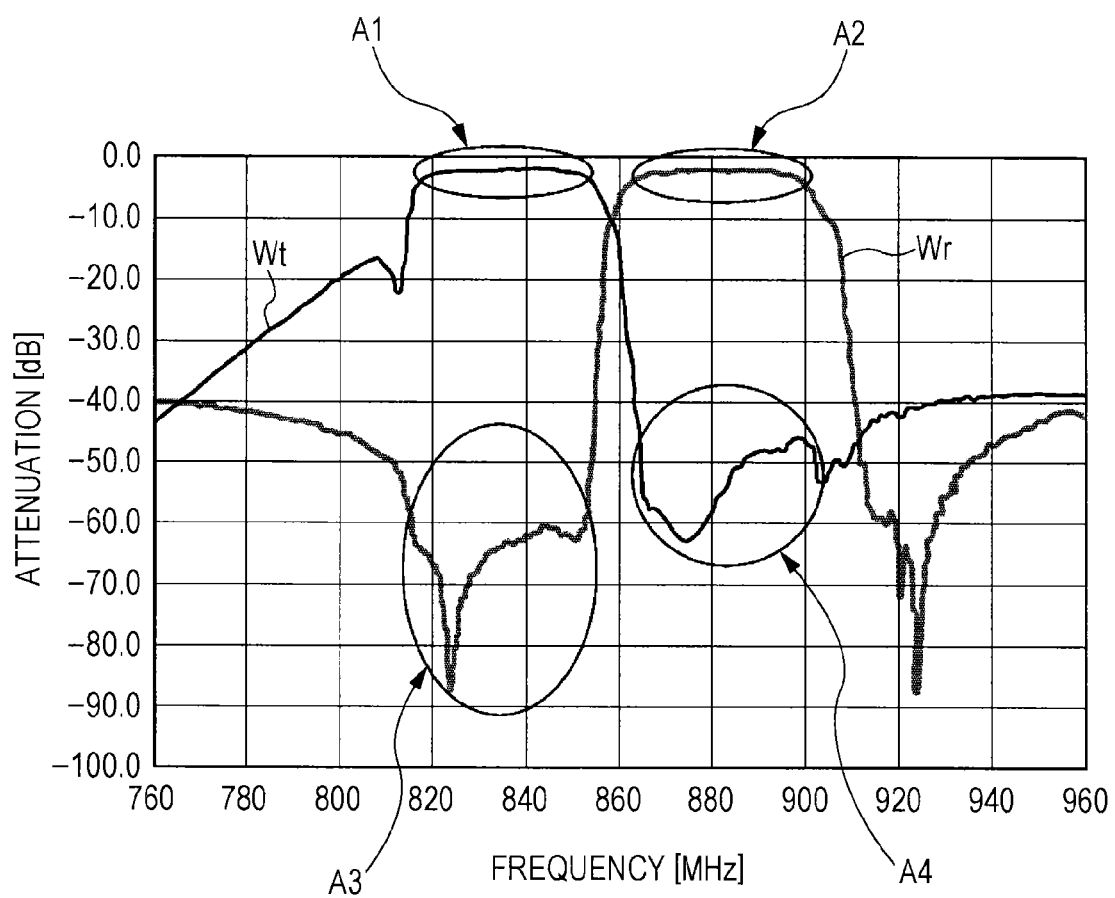
FIG. 4 is a graph for explaining duplexer operation.

The phase circuits 41a, 41b, 42, 43, and 44 are elements for making good separation between transmit and receive signals, by configuring it such that a signal heading from a transmit terminal to the antenna terminal does not flow towards the receiving end, and in addition, such that a signal in the receive frequency band does not flow towards the transmitting end. Each of the phase circuits 41a, 41b, and 42 connected to the reception bandpass filters 51 and 52 basically assumes the same functions as the phase circuit 311 built into the duplexer 31 described in FIG. 3. The first phase circuit 41a, the fourth phase circuit 43, and the second reception bandpass filter 51 are configured to block transmit signals passing through the second transmission bandpass filter 53 (B#2Tx) from looping back into the receiving end. The second phase circuit 41b, the fourth phase circuit 43, and the second reception bandpass filter 51 are configured to block transmit signals passing through the first transmission bandpass filter 54 (B#1Tx) from looping back into the receiving end. The third phase circuit 42, the fifth phase circuit 44, and the first reception bandpass filter 52 are configured to block transmit signals passing through the first transmission bandpass filter 54 (B#1Tx) from looping back into the receiving end.

In this embodiment, the transmission bandpass filter end is also provided with phase circuits 43 and 44, so that signals heading from the transmitting end to the antenna do not flow into the receiving end. The phase circuits 43 and 44 may also be omitted, depending on factors such as the properties of the transmission bandpass filters 53 and 54 as well as the reception bandpass filters 51 and 52.

However, the positions of the RF switches are not limited to the positions illustrated in the drawing. For example, the connective relationship between each RF switch and its corresponding phase circuit may also be reversed left-to-right in the drawing. In other words, although the RF switches are disposed between the phase circuits and the filters, the RF switches may be disposed instead between the antenna terminal 60 and the phase circuits.

Also, although only one RF switch is disposed in series with a bandpass filter and a phase circuit, it may also be configured such that RF switches are disposed at both sides of the bandpass filter and/or the phase circuit, with the RF switches operating in tandem. Consequently, it is possible to avoid a state in which components in an unused state are connected to the antenna or the transmitter and receiver circuits when an RF switch is off.

With this configuration, if a single band pair (one transmit frequency band and one receive frequency band) is to be utilized, the two RF switches corresponding to the two selected bandpass filters are switched on while the other RF switches are switched off. In the case of operating by inter-band carrier aggregation, the corresponding RF switches for simultaneously selecting at least three bandpass filters are switched on while the other RF switches are switched off.

With respect to the bandpass filters for frequency bands used in inter-band carrier aggregation, there are prepared multiple phase circuits which are selected according to the partner bandpass filter to be combined therewith. With the configuration in FIG. 6, if the bandpass filter 51 is to be selectively used in combination with multiple other bandpass filters, the phase circuits 41a and 41b are selectively utilized by selectively switching the RF switches 11a and 11b, depending on the transmission bandpass filter for the frequency band to be used for transmission.

Figure 7A:
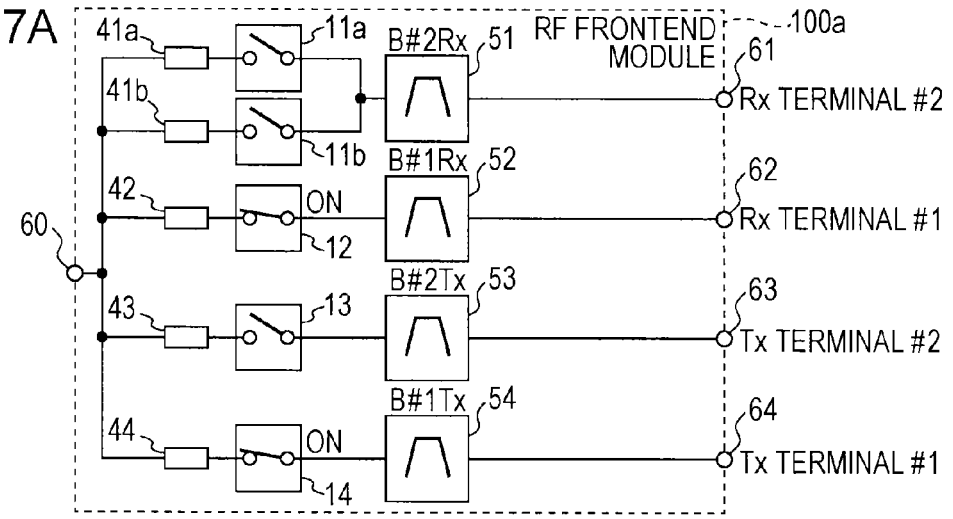
FIGS. 7(a), 7(b), and 7(c) are diagrams for explaining a first exemplary application of an RF frontend module with the configuration in FIG. 6.
Figure 7B:
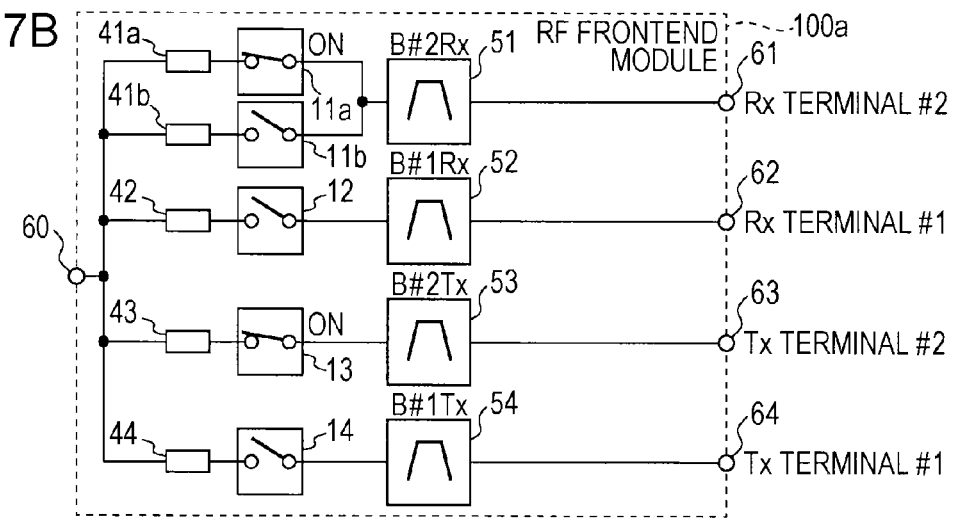
Figure 7C:
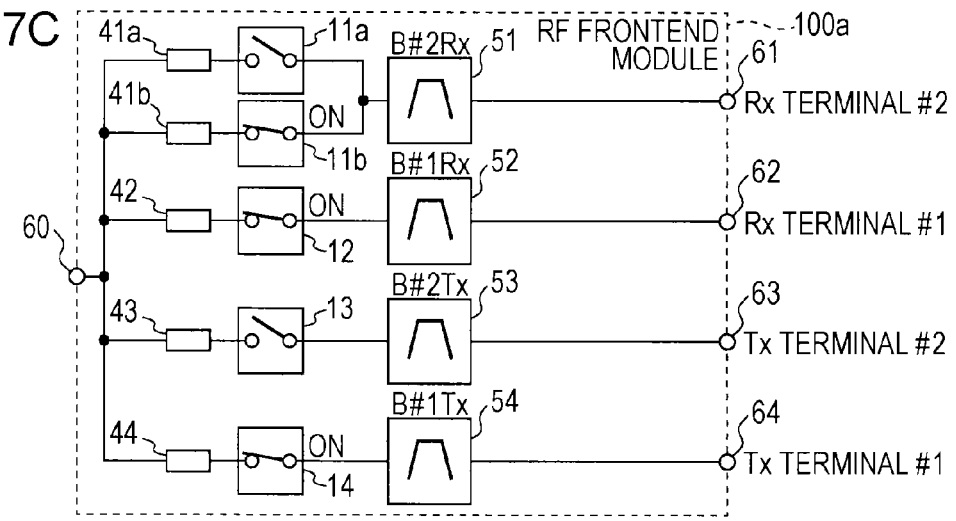

A first exemplary application of an RF frontend module 100a with the configuration in FIG. 6 will be described with FIGS. 7(a), 7(b), and 7(c). FIG. 7(a) illustrates the RF frontend module 100a in an operating mode in which the first band pair B#1 is utilized as single bands, while FIG. 7(b) illustrates an operating mode in which the second band pair B#2 is utilized as single bands. Meanwhile, FIG. 7(c) illustrates a third operating mode conducting inter-band carrier aggregation in which the first band pair B#1 is utilized as transmit/receive bands while simultaneously utilizing another frequency band (B#2Rx) as a receive band.

In this exemplary application, the receive terminals 61 and 62 are respectively utilized as receive terminals #2 and #1, while the transmit terminals 63 and 64 are respectively utilized as transmit terminals #2 and #1. The bandpass filter 52 treats a first receive frequency band as a passband, while the bandpass filter 51 treats a second receive frequency band as a passband. The bandpass filter 54 treats a first transmit frequency band as a passband, while the bandpass filter 53 treats a second transmit frequency band as a passband.

The first operating mode illustrated in FIG. 7(a) corresponds to the case of utilizing the first band pair B#1 (the first transmit frequency band and the first receive frequency band) individually. The RF switches 12 and 14 which respectively correspond to the bandpass filters 52 and 54 are switched on, while the other RF switches are switched off.

The second operating mode illustrated in FIG. 7(b) corresponds to the case of utilizing the second band pair B#2 (the second transmit frequency band and the second receive frequency band) individually. The RF switches 11a and 13 which respectively correspond to the bandpass filters 51 and 53 are switched on, while the other RF switches are switched off.

The third operating mode illustrated in FIG. 7(c) corresponds to inter-band carrier aggregation in which the first band pair B#1 (the first transmit frequency band and the first receive frequency band) is utilized together with the second receive frequency band (B#2Rx). The RF switches 12 and 14, which respectively correspond to the bandpass filters 52 and 54, and the other RF switch 11b for the bandpass filter 51 are switched on, while the other RF switches are switched off. In this way, in the third operating mode, the bandpass filter 51 utilizes the phase circuit 41b instead of the phase circuit 41a utilized in the first operating mode. Consequently, a more suitable phase circuit is selected depending on which other bandpass filters are to be combined with the bandpass filter 51.

In this embodiment, multiple phase circuits are prepared for a specific reception bandpass filter, and these phase circuits are selectively switched and used depending on the partner transmission bandpass filter to be combined with the specific reception bandpass filter. In other words, the embodiment acts such that the impedance of the transmission bandpass filter as seen from the antenna terminal side is essentially open (a sufficiently high impedance compared to an impedance of 50Ω in the passband) in the transmit frequency band to be specifically combined from among the pass/block bands of the reception bandpass filter. Thus, transmit signals or other unwanted signals do not enter the receiver circuit and good separation between transmit signals and receive signals is achieved.

Figure 8:
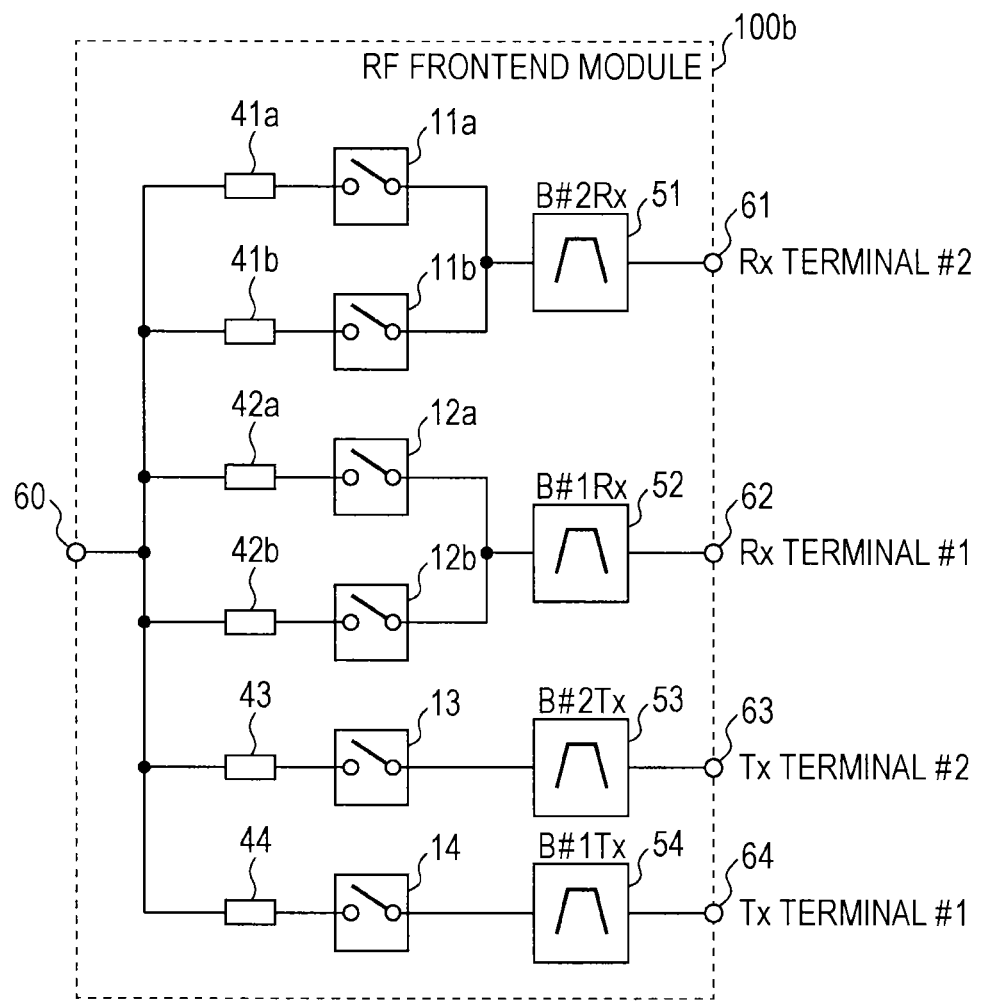
FIG. 8 is a diagram illustrating another exemplary configuration of an RF frontend module according to the embodiment.

FIG. 8 illustrates another exemplary configuration of an RF frontend module according to the embodiment. In FIG. 8, like reference signs are given to elements similar to those illustrated in FIGS. 6 and 7(a) to 7(c), and duplicate description thereof is reduced or omitted.

In the RF frontend module 100b illustrated in FIG. 8, two phase circuits 41a and 41b are connected in parallel between the reception bandpass filter 51 (B#2Rx) and the antenna terminal 60 via respective RF switches 11a and 11b.

The RF switches 11a and 11b are for switching the phase circuit in use according to the partner to be combined with when the bandpass filter 51 is to be used in selective combination with either the transmission bandpass filter 53 (B#2Tx) or 54 (B#1Tx).

In addition, two phase circuits 42a and 42b are connected in parallel between the reception bandpass filter 52 (B#1Rx) and the antenna terminal 60 via respective RF switches 12a and 12b. The RF switches 12a and 12b are for switching the phase circuit in use according to the partner to be combined with when the bandpass filter 52 is to be used in selective combination with either the transmission bandpass filter 53 (B#2Tx) or 54 (B#1Tx). In this way, with the exemplary application in FIG. 8, multiple phase circuits 42a and 42b are also selectively connectable with respect to the bandpass filter 52.

FIG. 9 illustrates the operating frequencies and the on/off states of six RF switches (SW#1 to SW#6) for each of five operating modes of the RF frontend module 100b in FIG. 8.

Under the "Operating Frequency" label in FIG. 9, the first operating mode "B#1" indicates that a first band pair (i.e., a first transmit frequency band and a first receive frequency band) are used. In the first operating mode, the RF switches 12b (SW#4) and 14 (SW#6) are switched on, while the other RF switches are switched off. At this point, the B#1Rx filter 52 is connected to the phase circuit 42b and the phase circuit 44 is connected to the B#1Tx filter 54. The combination of the phase circuit 42b and the phase circuit 44 is configured (designed) such that the relationship between the frequency characteristics of the filters is appropriate when combining the B#1Tx filter 54 with the B#1Rx filter 52. Thus, isolation between the B#1Tx band and the B#1Rx band is sufficiently ensured.

The second operating mode "B#2" indicates that a second band pair (i.e., a second transmit frequency band and a second receive frequency band) are used. In this operating mode, the RF switches 11a (SW#1) and 13 (SW#5) are switched on, while the other RF switches are switched off. At this point, the B#2Rx filter 51 is connected to the phase circuit 41a and the phase circuit 43 is connected to the B#2Tx filter 53. The combination of the phase circuit 41a and the phase circuit 43 is configured (designed) such that the relationship between the frequency characteristics of the filters is appropriate when combining the B#2Tx filter 53 with the B#2Rx filter 51, and isolation between the B#2Tx band and the B#2Rx band is sufficiently ensured.

The third and fourth operating modes are modes that realize inter-band carrier aggregation with two downlinks (2DL) and one uplink (1UL).

The third operating mode "B#1Rx+B#2Rx, B#1Tx" indicates that first and second receive frequency bands and a first transmit frequency band are to be used in combination. In this operating mode, the RF switches 11b (SW#2), 12b (SW#4), and 14 (SW#6) are switched on, while the other RF switches are switched off. The combination of the phase circuit 41b and the phase circuit 44 is a more appropriate phase circuit combination for separating the B#1Tx filter 54 and the B#2Rx filter 51. The combination of the phase circuit 42b and the phase circuit 44 is a more appropriate phase circuit combination for separating the B#1Tx filter 54 and the B#1Rx filter 52.

The fourth operating mode "B#1Rx+B#2Rx, B#2Tx" indicates that first and second receive frequency bands and a second transmit frequency band are to be used in combination. In this operating mode, the RF switches 11a (SW#1), 12a (SW#3), and 13 (SW#5) are switched on, while the other RF switches are switched off. In this operating mode, the combination of the phase circuit 41a and the phase circuit 43 is a more appropriate phase circuit combination for separating the B#2Tx filter 53 and the B#2Rx filter 51. The combination of the phase circuit 42a and the phase circuit 43 is a more appropriate phase circuit combination for separating the B#2Tx filter 53 and the B#1Rx filter 52.

In the fifth operating mode, the frequency bands from neither the first band pair B#1 nor the second band pair B#2 are used. In other words, SW#1 to SW#6 are all switched off.

Figure 1:
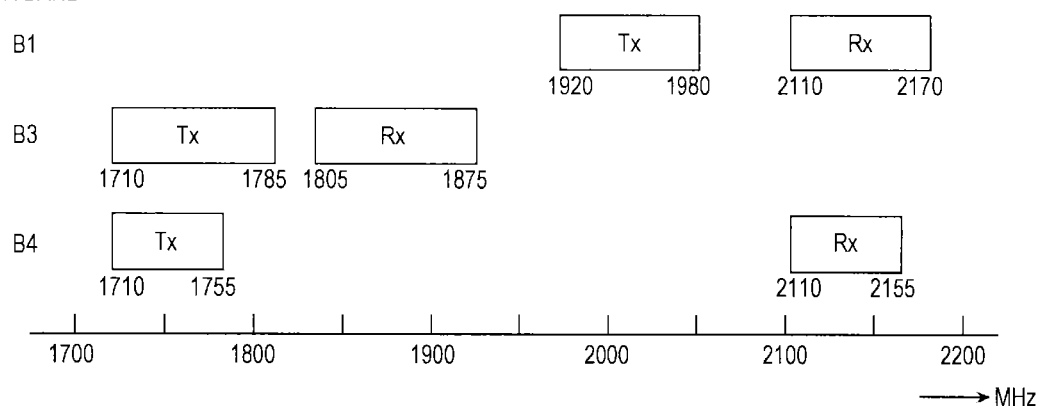
FIG. 1 is a diagram illustrating examples for three paired frequency bands (pair bands) B1, B3, and B4 as examples of pair bands for FDD.
Figure 2:
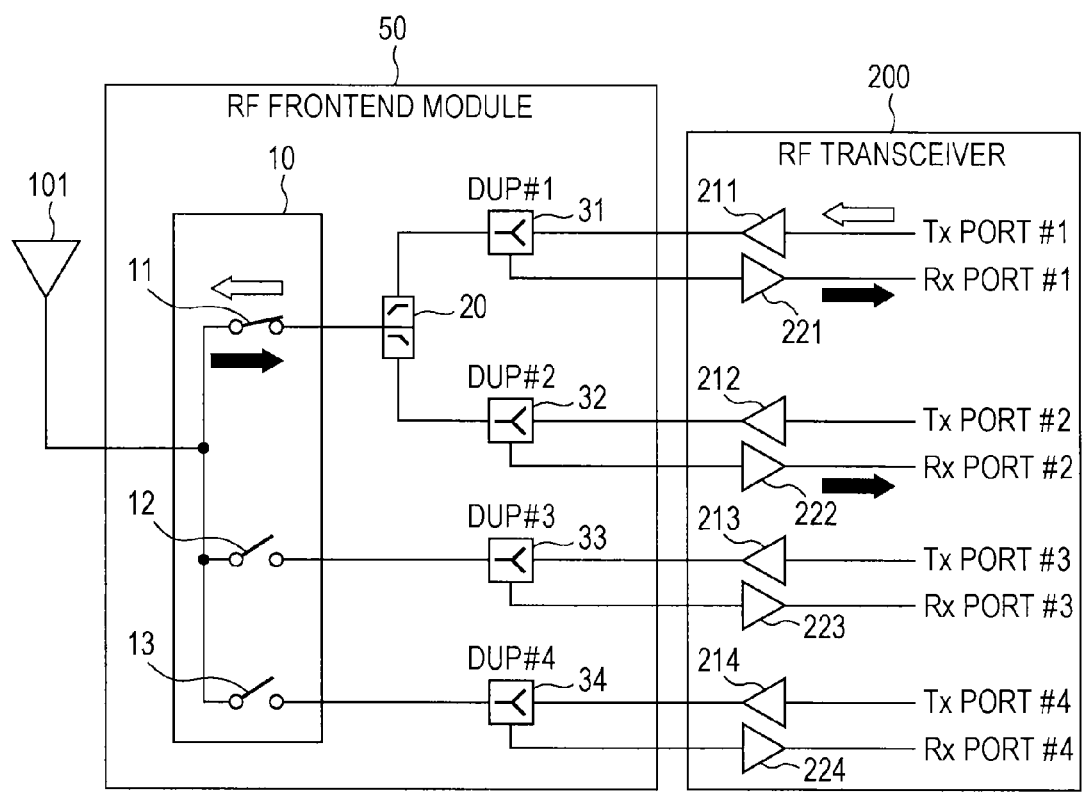
FIG. 2 is a diagram illustrating an exemplary configuration of an existing RF frontend module compatible with inter-band carrier aggregation.

Note that the configuration and operation of the RF frontend module 100b illustrated in FIG. 8 is equivalent to that of the conventional RF frontend module 50 illustrated in FIG. 2, with the exception of support for 2UL inter-band carrier aggregation. A comparison of both configurations reveals that the diplexer 20 in FIG. 2 has been removed from the configuration in FIG. 8. Also, the functions of the duplexers 31 and 32 have been realized by a format in which multiple pairs of phase circuits and RF switches connected in series are individually connected in parallel to the bandpass filters that were internal to the duplexers 31 and 32.

By removing the diplexer 20, its insertion loss is cut back, and the transmit power efficiency and receive sensitivity improve by an equivalent degree. In addition, by not utilizing duplexers, one is freed from the design constraints of duplexers in the case of utilizing carrier aggregation, and there is an advantage in that inter-band carrier aggregation using frequency bands which are close to each other is realizable. However, as discussed later, the removal of duplexers is not a necessary condition for the present embodiments.

Although the foregoing description takes the example of combining two pair bands B#1 and B#2, it is also possible to support combinations of three or more pair bands.

Figure 10:
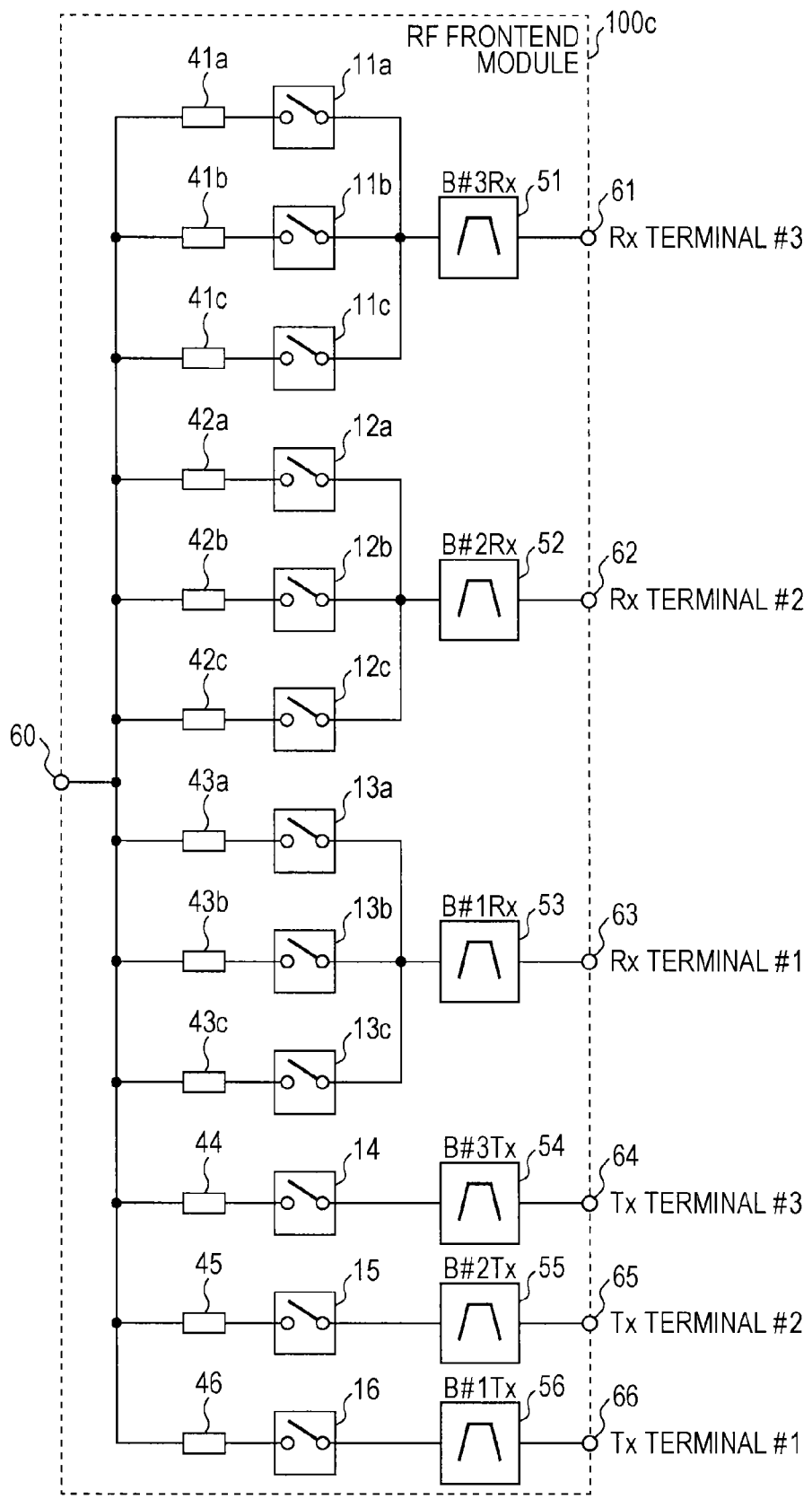
FIG. 10 is a diagram illustrating an exemplary configuration of an RF frontend module that supports three pair bands B#1, B#2, and B#3.

FIG. 10 illustrates an exemplary configuration of an RF frontend module 100c that supports three such pair bands B#1, B#2, and B#3. Like reference signs are given to elements which are similar to those illustrated in the drawings already discussed.

The output terminal of the B#3Rx filter 51 is connected to the receive terminal 61 (receive terminal #3). Between the input terminal of this filter 51 and the antenna terminal 60, three phase circuits 41a, 41b, and 41c are connected in parallel via respectively corresponding RF switches 11a, 11b, and 11c.

The output terminal of the B#2Rx filter 52 is connected to the receive terminal 62 (receive terminal #2). Between the input terminal of this filter 52 and the antenna terminal 60, three phase circuits 42a, 42b, and 42c are connected in parallel via respectively corresponding RF switches 12a, 12b, and 12c.

Similarly, the output terminal of the B#1Rx filter 53 is connected to the receive terminal 63 (receive terminal #1). Between the input terminal of this filter 53 and the antenna terminal 60, three phase circuits 43a, 43b, and 43c are connected in parallel via respectively corresponding RF switches 13a, 13b, and 13c.

The input terminal of the B#3Tx filter 54 is connected to the transmit terminal 64 (transmit terminal #3). Between the output terminal of the B#3Tx filter 54 and the antenna terminal 60, the phase circuit 44 is connected via the RF switch 14.

The input terminal of the B#2Tx filter 55 is connected to the transmit terminal 65 (transmit terminal #2). Between the output terminal of the B#2Tx filter 55 and the antenna terminal 60, the phase circuit 45 is connected via the RF switch 15.

The input terminal of the B#1Tx filter 56 is connected to the transmit terminal 66 (transmit terminal #1). Between the output terminal of the B#1Tx filter 56 and the antenna terminal 60, the phase circuit 46 is connected via the RF switch 16.

With inter-band carrier aggregation combining three pair bands, possible combinations of bands used as a transmit/receive band and a receive band are as follows.

| Tx/Rx | | Rx |
|---|---|---|
| B#1 | + | B#2 |
| B#1 | + | B#3 |
| B#2 | + | B#1 |
| B#2 | + | B#3 |
| B#3 | + | B#1 |
| B#3 | + | B#2 |
| B#1 | + | B#2, B#3 |
| B#2 | + | B#3, B#1 |
| B#3 | + | B#1, B#2 |

FIG. 11 illustrates the operating frequencies and the on/off states of twelve RF switches (SW#1 to SW#12) for each of thirteen operating modes of the RF frontend module 100c in FIG. 10. The labels for the operating frequency bands are similar to the case of FIG. 9.

The first to third operating modes illustrated in FIG. 11 are operating modes that respectively use the first pair band B#1, the second pair band B#2, and the third pair band B#3 individually. In other words, the first, second, and third operating modes are operating modes that each utilize a single pair band.

In the first operating mode, only the RF switch 13c (SW#9) and the RF switch 16 (SW#12) are switched on, while the others are switched off. In the second operating mode, the RF switch 12b (SW#5) and the RF switch 15 (SW#11) are switched on, while the other RF switches are switched off. In the third operating mode, the RF switch 11a (SW#1) and the RF switch 14 (SW#10) are switched on, while the others are switched off.

The fourth to ninth operating modes illustrated in FIG. 11 correspond to inter-band carrier aggregation with one uplink and two downlinks.

In the fourth operating mode, B#1Rx+B#2Rx and B#1Tx are used in combination. The RF switch 12c (SW#6), the RF switch 13c (SW#9), and the RF switch 16 (SW#12) are switched on, while the other RF switches are switched off.

In the fifth operating mode, B#1Rx+B#3Rx and B#1Tx are used in combination. The RF switch 11c (SW#3), the RF switch 13c (SW#9), and the RF switch 16 (SW#12) are switched on, while the other RF switches are switched off.

In the sixth operating mode, B#1Rx+B#2Rx and B#2Tx are used in combination. The RF switch 12b (SW#5), the RF switch 13b (SW#8), and the RF switch 15 (SW#11) are switched on, while the other RF switches are switched off.

In the seventh operating mode, B#2Rx+B#3Rx and B#2Tx are used in combination. The RF switch 11b (SW#2), the RF switch 12b (SW#5), and the RF switch 15 (SW#11) are switched on, while the other RF switches are switched off.

In the eighth operating mode, B#1Rx+B#3Rx and B#3Tx are used in combination. The RF switch 11a (SW#1), the RF switch 13a (SW#7), and the RF switch 14 (SW#10) are switched on, while the other RF switches are switched off.

In the ninth operating mode, B#2Rx+B#3Rx and B#3Tx are used in combination. The RF switch 11a (SW#1), the RF switch 12a (SW#4), and the RF switch 14 (SW#10) are switched on, while the other RF switches are switched off.

The tenth to twelfth operating modes correspond to inter-band carrier aggregation with one uplink and three downlinks.

In the tenth operating mode, B#1Rx+B#2Rx+B#3Rx and B#1Tx are used in combination. The RF switch 11c (SW#3), the RF switch 12c (SW#6), the RF switch 13c (SW#9), and the RF switch 16 (SW#12) are switched on, while the other RF switches are switched off.

In the eleventh operating mode, B#1Rx+B#2Rx+B#3Rx and B#2Tx are used in combination. The RF switch 11b (SW#2), the RF switch 12b (SW#5), the RF switch 13b (SW#8), and the RF switch 15 (SW#11) are switched on, while the other RF switches are switched off.

In the twelfth operating mode, B#1Rx+B#2Rx+B#3Rx and B#3Tx are used in combination. The RF switch 11a (SW#1), the RF switch 12a (SW#4), the RF switch 13a (SW#7), and the RF switch 14 (SW#10) are switched on, while the other RF switches are switched off.

In the thirteenth operating mode, the frequency bands from neither the first, second, nor third band pairs are used. In other words, SW#1 to SW#12 are all switched off.

Figure 12:
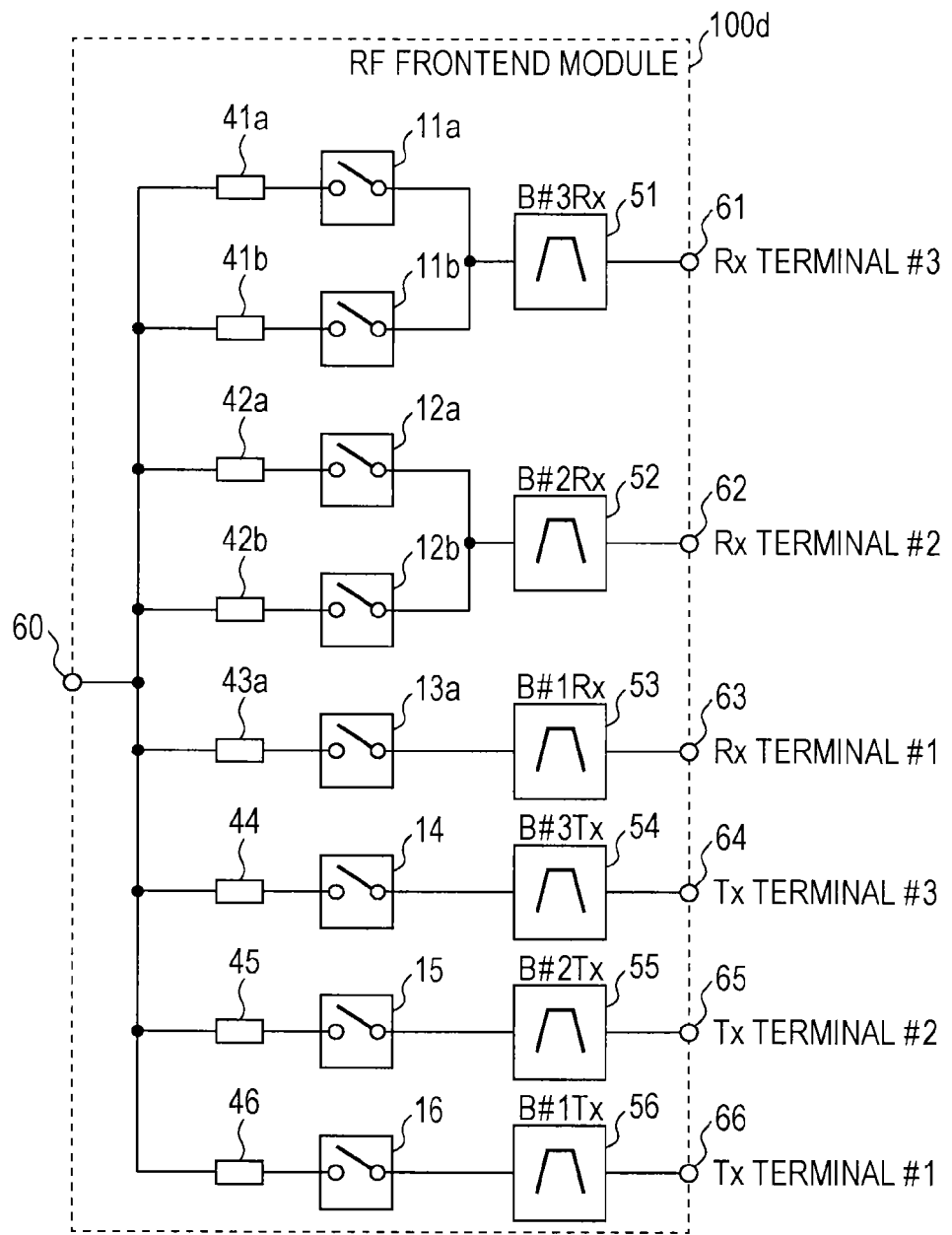
FIG. 12 is a diagram illustrating an exemplary configuration of an RF frontend module of limited configuration in which some elements of the RF frontend module illustrated in FIG. 10 have been removed.

FIG. 12 illustrates an exemplary configuration of an RF frontend module 100d of limited configuration in which some elements of the RF frontend module 100c illustrated in FIG. 10 have been removed. Namely, the RF frontend module 100d is the result of removing the RF switch 11c and phase circuit 41c, the RF switch 12c and phase circuit 42c, the RF switch 13b and phase circuit 43b, and the RF switch 13c and phase circuit 43c from the RF frontend module 100c in FIG. 10. With inter-band carrier aggregation in this configuration, possible combinations of bands used as a transmit/receive band and a receive band are as follows.

| Tx/Rx | | Rx |
|---|---|---|
| B#1 | + | B#2 |
| B#1 | + | B#3 |
| B#1 | + | B#2, B#3 |

By taking such a limited configuration in the case where the frequency band to be used for UL is known, the number of RF switches and phase circuits can be reduced when operating with inter-band carrier aggregation in this way.

FIG. 13 illustrates the operating frequencies and the on/off states of eight RF switches (SW#1 to SW#8) for each of seven operating modes of the RF frontend module 100d in FIG. 12.

The first to third operating modes illustrated in FIG. 13 are operating modes that respectively use the first pair band B#1, the second pair band B#2, and the third pair band B#3 individually. In other words, the first, second, and third operating modes are operating modes that each utilize a single pair band.

In the first operating mode, only the RF switch 13a (SW#5) and the RF switch 16 (SW#8) are switched on, while the others are switched off.

In the second operating mode, the RF switch 12a (SW#3) and the RF switch 15 (SW#7) are switched on, while the other RF switches are switched off.

In the third operating mode, the RF switch 11a (SW#1) and the RF switch 14 (SW#6) are switched on, while the others are switched off.

Figure 14:
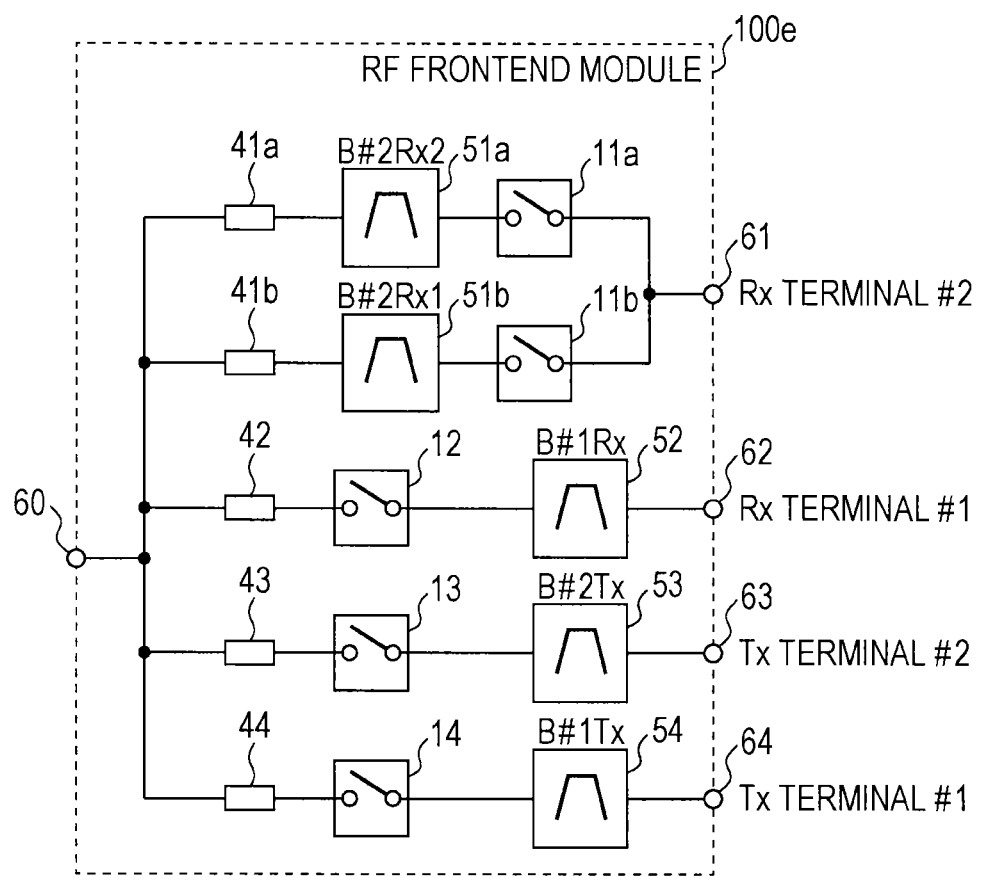
FIG. 14 is a diagram illustrating a first exemplary modification of an RF frontend module with the basic configuration of the embodiment illustrated in FIG. 6.

The fourth and fifth operating modes illustrated in FIG. 13 correspond to inter-band carrier aggregation with one uplink and two downlinks. In the fourth operating mode, B#1Rx+B#2Rx and B#1Tx are used in combination. The RF switch 12b (SW#4), the RF switch 13a (SW#5), and the RF switch 16 (SW#8) are switched on, while the other RF switches are switched off. In the fifth operating mode, B#1Rx+B#3Rx and B#1Tx are used in combination. The RF switch 11b (SW#2), the RF switch 13a (SW#5), and the RF switch 16 (SW#8) are switched on, while the other RF switches are switched off. The sixth operating mode corresponds to inter-band carrier aggregation with one uplink and three downlinks. In other words, B#1Rx+B#2Rx+B#3Rx and B#1Tx are used in combination. The RF switch 11b (SW#2), the RF switch 12b (SW#4), the RF switch 13a (SW#5), and the RF switch 16 (SW#8) are switched on, while the other RF switches are switched off. In the seventh operating mode, the frequency bands from neither the first, second, nor third band pairs are used. In other words, SW#1 to SW#8 are all switched off. FIG. 14 illustrates a first exemplary modification of an RF frontend module with the basic configuration of the embodiment illustrated in FIG. 6. Like reference signs are given to elements which are similar to those illustrated in FIG. 6, and duplicate description thereof will be reduced or omitted. In this RF frontend module 100e, a specific bandpass filter in FIG. 6 (in this example, the filter 51) is provided in the form of first and second bandpass filters 51a and 51b (B#2Rx2 and B#2Rx1) which have the same passband but different attenuation properties, and which are respectively disposed between the RF switches 11a and 11b and their corresponding phase circuits 41a and 41b. Likewise in this configuration, the positions of the RF switches are not limited to the positions illustrated in the drawing.

Figure 15A:
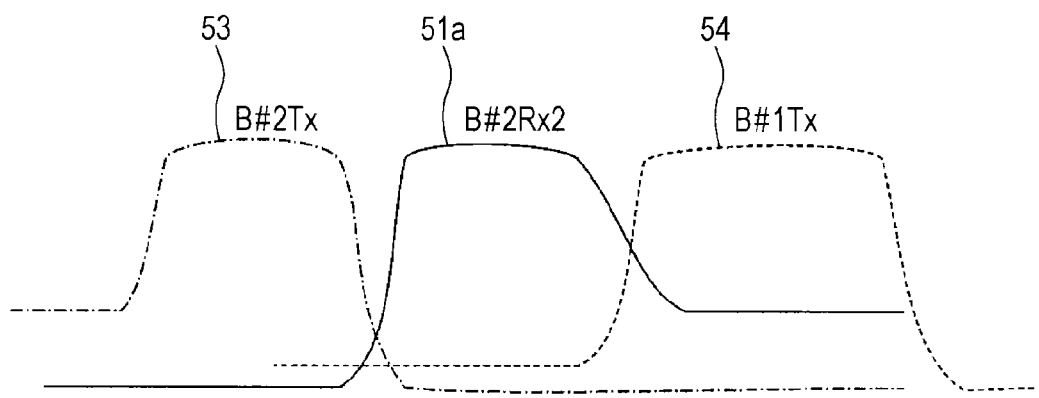
FIGS. 15A and 15B are graphs illustrating waveforms of the change in attenuation at the boundary between the passbands of respective bandpass filters and frequency bands outside thereof.
Figure 15B:
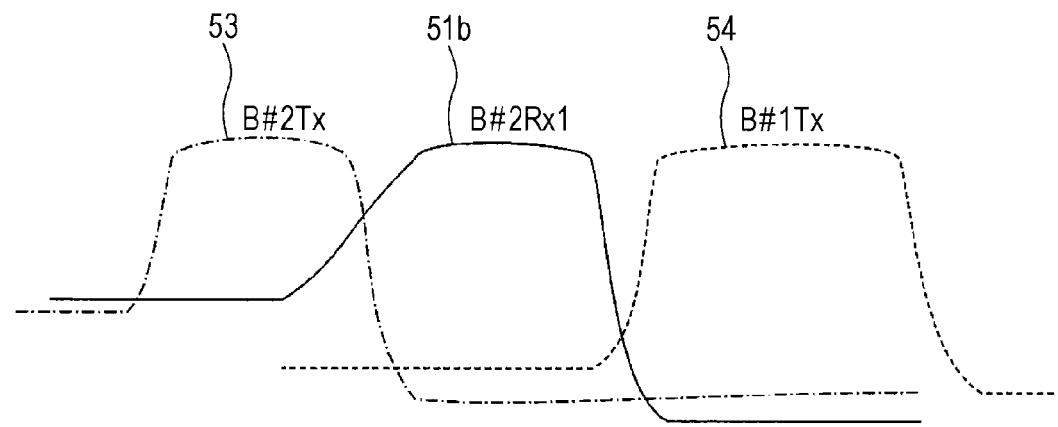

In this exemplary modification, a specific reception bandpass filter is provided in the form of two filters which have the same passband but different attenuation properties. These two filters are respectively selected when used in combination with a corresponding first or second transmission bandpass filter. In the case of carrier aggregation where a given frequency band is used in selective combination with any of multiple other frequency bands, not only the phase circuit but also the bandpass filter itself is switched depending on the partner to be combined with. As illustrated in FIG. 15, the cutoff waveform at the boundary between the passband of each bandpass filter and the region outside thereof is not necessarily steep, and in addition, the upper and lower cutoffs may differ from each other. Thus, as illustrated in FIG. 15, bandpass filters 51a and 51b (B#2Rx2 and B#2Rx1) are prepared which have the same passband but different upper and lower cutoff attenuation properties, and the bandpass filters are switched together with the phase circuits depending on the transmit frequency band to be used.

FIG. 16 illustrates the operating frequencies and the on/off states of five RF switches (SW#1 to SW#5) for each of four operating modes of the RF frontend module 100e in FIG. 14. The first and second operating modes in FIG. 16 are operating modes that respectively use a single band pair.

Figure 17:
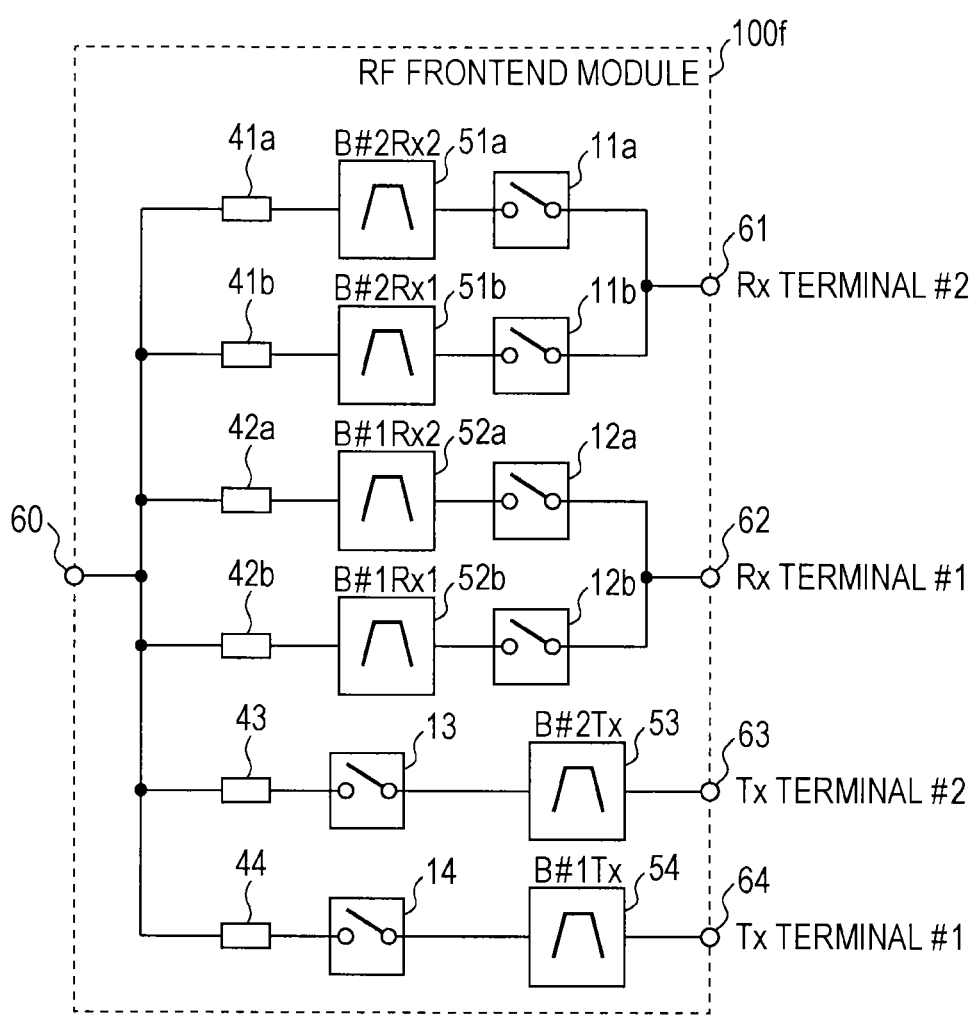
FIG. 17 is a diagram illustrating a second exemplary modification of an RF frontend module with the basic configuration of the embodiment illustrated in FIG. 6.

In the first operating mode, the RF switch 12 (SW#3) and the RF switch 14 (SW#5) are switched on, while the other RF switches are switched off. In the second operating mode, the RF switch 11a (SW#1) and the RF switch 13 (SW#4) are switched on, while the other RF switches are switched off. Thus, the B#2Rx2 filter 51a is selected as the Rx filter for B#2 with respect to the B#2Tx filter 53. The third operating mode is a mode that operates by inter-band carrier aggregation with two downlinks (2DL) and one uplink (1UL). In the third operating mode, the RF switch 11b (SW#2), the RF switch 12 (SW#3), and the RF switch 14 (SW#5) are switched on, while the other RF switches are switched off. Thus, the B#1Rx filter 52 and the B#2Rx1 filter 51b are selected with respect to the B#1Tx filter 54. In other words, the B#2Rx1 filter 51b is selected as the Rx filter for B#2 with respect to the B#1Tx filter 54. In the fourth operating mode, the frequency bands from neither the first band pair B#1 nor the second band pair B#2 are used. In other words, SW#1 to SW#5 are all switched off. FIG. 17 illustrates a second exemplary modification of an RF frontend module with the basic configuration of the embodiment illustrated in FIG. 6. Like reference signs are given to elements which are similar to those illustrated in FIG. 14, and duplicate description thereof will be reduced or omitted. This RF frontend module 100f of the second exemplary modification is provided with first and second bandpass filters 52a and 52b (B#1Rx2 and B#1Rx1) for the specific bandpass filter 52 in FIG. 6. The first and second bandpass filters 52a and 52b have the same passband but different attenuation properties, and are respectively disposed between the RF switches 12a and 12b and their corresponding phase circuits 42a and 42b. Thus, the operating modes corresponding to inter-band carrier aggregation are increased by one. FIG. 18 illustrates the operating frequencies and the on/off states of six RF switches (SW#1 to SW#6) for each of five operating modes of the RF frontend module 100f in FIG. 17. The first and second operating modes in FIG. 18 are operating modes that respectively use a single band pair. In the first operating mode, the RF switch 12b (SW#4) and the RF switch 14 (SW#6) are switched on, while the other RF switches are switched off. Thus, the B#1Rx1 filter 52b is selected as the Rx filter for B#1 with respect to the B#1Tx filter 54. In the second operating mode, the RF switch 11a (SW#1) and the RF switch 13 (SW#5) are switched on, while the other RF switches are switched off. Thus, the B#2Rx2 filter 51a is selected with respect to the B#2Tx filter 53. In other words, the B#2Rx2 filter 51a is selected as the Rx filter for B#1 with respect to the B#2Tx filter 53. The third and fourth operating modes are modes that operate by inter-band carrier aggregation with two downlinks (2DL) and one uplink (1UL). In the third operating mode, the RF switch 11b (SW#2), the RF switch 12b (SW#4), and the RF switch 14 (SW#6) are switched on, while the other RF switches are switched off. Thus, the B#2Rx1 filter 51b and the B#1Rx1 filter 52b are selected with respect to the B#1Tx filter 54. In other words, the B#2Rx1 filter 51b is selected as the B#2Rx filter with respect to the B#1Tx filter 54. In the fourth operating mode, the RF switch 11a (SW#1), the RF switch 12a (SW#3), and the RF switch 13 (SW#5) are switched on, while the other RF switches are switched off. Thus, the B#2Rx2 filter 51*a* and the B#1Rx2 filter 52*a* are selected with respect to the B#2Tx filter 53. In other words, the B#2Rx2 filter 51*a* is selected as the B#2Rx filter with respect to the B#2Tx filter 53. In the fifth operating mode, the frequency bands from neither the first band pair B#1 nor the second band pair B#2 are used. In other words, SW#1 to SW#6 are all switched off.

Figure 19:
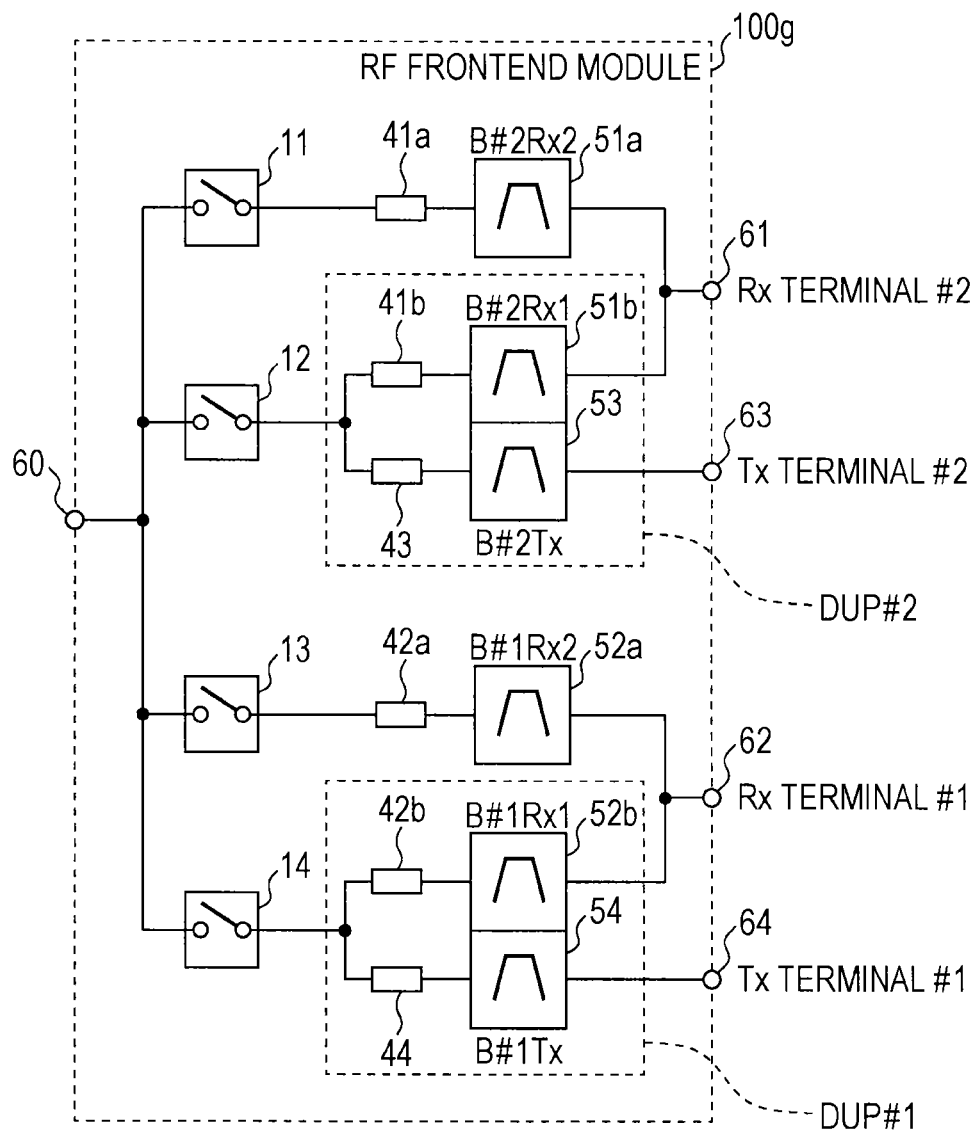
FIG. 19 is a diagram illustrating an exemplary modification of the RF frontend module in FIG. 17.

Next, an exemplary modification of the RF frontend module 100*f* in FIG. 17 will be described with FIG. 19. In FIG. 19, like reference signs are given to elements similar to those illustrated in FIG. 17, and duplicate description thereof will be reduced or omitted. The RF frontend module 100*g* in FIG. 19 is a realization of a configuration equivalent to the RF frontend module 100*f* using conventional-type duplexers. Namely, a specific reception bandpass filter, a phase circuit connected thereto, and a corresponding transmission bandpass filter are constructed with a duplexer. A single RF switch is provided with respect to this duplexer, and this single RF switch is shared between the relevant reception bandpass filter and transmission bandpass filter.

More specifically, the reception bandpass filter 51*b* (B#2Rx1) and the transmission bandpass filter 53 (B#2Tx) are constructed with a single duplexer DUP#2. In the duplexer 31 illustrated in FIG. 3, the phase circuit 311 is connected to only one of the two bandpass filters 312 and 313, but in the duplexer DUP#2, respective phase circuits 42*a* and 43 are connected to both bandpass filters 51*b* and 53. The common connection terminal of the phase circuits 41*b* and 43 are connected to the antenna terminal 60 via the RF switch 12.

Similarly, the reception bandpass filter 52*b* (B#1Rx1) and the transmission bandpass filter 54 (B#1Tx) are constructed with a single duplexer DUP#1. In the duplexer DUP#1, respective phase circuits 42*b* and 44 are connected to both bandpass filters 52*b* and 54. The common connection terminal of the phase circuits 42*b* and 44 are connected to the antenna terminal 60 via the RF switch 14. The bandpass filter 51*a* (B#2Rx2) and the bandpass filter 51*b* (B#2Rx1) have the same passband but different attenuation properties on both sides of the passband. Similarly, the bandpass filter 52*a* (B#1Rx2) and the bandpass filter 52*b* (B#1Rx1) have the same passband but different attenuation properties on both sides of the passband. Although the RF frontend module 100*g* in FIG. 19 achieves functions equivalent to the RF frontend module 100*f* in FIG. 17, the number of RF switches is reduced from six to four. This result is realized by devising combinations of multiple bandpass filters, typically by utilizing duplexers DUP#1 and DUP#2.

FIG. 20 illustrates the operating frequencies and the on/off states of four RF switches (SW#1 to SW#4) for each of five operating modes of the RF frontend module 100*g* in FIG. 19. The first and second operating modes in FIG. 20 are operating modes that respectively use a single band pair.

In the first operating mode, only the RF switch 14 (SW#4) is switched on, while the other RF switches are switched off. Thus, the B#1Rx1 filter 52*b* is selected with respect to the B#1Tx filter 54. In the second operating mode, only the RF switch 12 (SW#2) is switched on, while the other RF switches are switched off. Thus, the B#2Rx1 filter 51*b* is selected with respect to the B#2Tx filter 53. The third and fourth operating modes are modes that operate by inter-band carrier aggregation with two downlinks (2DL) and one uplink (1UL). In the third operating mode, the RF switch 11 (SW#1) and the RF switch 14 (SW#4) are switched on, while the other RF switches are switched off. Thus, the B#1Rx1 filter 52*b* and the B#2Rx2 filter 51*a* are selected with respect to the B#1Tx filter 54. In the fourth operating mode, the RF switch 12 (SW#2) and the RF switch 13 (SW#3) are switched on, while the other RF switches are switched off. Thus, the B#2Rx1 filter 51*b* and the B#1Rx2 filter 52*a* are selected with respect to the B#2Tx filter 53.

In the fifth operating mode, the frequency bands from neither the first band pair B#1 nor the second band pair B#2 are used. In other words, SW#1 to SW#4 are all switched off.

In any of the examples, a configuration in which the antenna terminal 60 connects to a component such as diplexer, RF switch, or RF tuner rather than connecting directly to an antenna is also possible. As described in the foregoing, an exemplary embodiment includes various aspects like the following.

(1) An FDD RF frontend module provided with a first transmission bandpass filter that takes a first transmit frequency band as a passband, a second transmission bandpass filter that takes a second transmit frequency band as a passband, a first reception bandpass filter that takes a first receive frequency band as a passband, a second reception bandpass filter that takes a second receive frequency band as a passband, first to fifth RF switches, a first phase circuit that, by means of the first RF switch, is selectively connected between the second reception bandpass filter and the antenna terminal, a second phase circuit that, by means of the second RF switch, is selectively connected between the second reception bandpass filter and the antenna terminal, and a third phase circuit that, by means of the third RF switch, is selectively connected between the first reception bandpass filter and the antenna terminal, wherein the second transmission bandpass filter and the antenna terminal are selectively connected by means of the fourth RF switch, the first transmission bandpass filter and the antenna terminal are selectively connected by means of the fifth RF switch, and the FDD RF frontend module operates in an operating mode from among a first operating mode in which the third and fifth RF switches are switched on while the other RF switches are switched off, a second operating mode in which the first and fourth RF switches are switched on while the other RF switches are switched off, and a third operating mode in which the second, third, and fifth RF switches are switched on while the other RF switches are switched off.

(2) The RF frontend module according to (1), wherein the first phase circuit is configured to block transmit signals passing through the second transmission bandpass filter from looping back into the receiving end, and the second phase circuit is configured to block transmit signals passing through the first transmission bandpass filter from looping back into the receiving end.

(3) The RF frontend module according to (1) or (2), being further provided with a fourth phase circuit that, by means of the fourth RF switch, is selectively connected between the second transmission bandpass filter and the antenna terminal, and a fifth phase circuit that, by means of the fifth RF switch, is selectively connected between the first transmission bandpass filter and the antenna terminal.

(4) The RF frontend module according to any of (1) to (3), wherein two filters which have the same passband but different attenuation properties are included as the second reception bandpass filter, the two filters being respectively selected when used in combination with the corresponding first or second transmission bandpass filter.

(5) The RF frontend module according to (4), wherein a specific reception bandpass filter, the phase circuit connected thereto, and its corresponding transmission bandpass filter are constructed with a duplexer, a single RF switch is provided with respect to the duplexer, and the single RF switch is shared between the relevant reception bandpass filter and transmission bandpass filter.

(6) A mobile wireless device provided with an FDD RF frontend module connected to an antenna, an RF transceiver that is connected to the RF frontend module, includes a transmitter circuit and a receiver circuit, and conducts high-frequency signal transmit/receive processing, and a baseband processor that is connected to the RF transceiver and conducts baseband processing, wherein the RF frontend module is provided with a first transmission bandpass filter that takes a first transmit frequency band as a passband, a second transmission bandpass filter that takes a second transmit frequency band as a passband, a first reception bandpass filter that takes a first receive frequency band as a passband, a second reception bandpass filter that takes a second receive frequency band as a passband, first to fifth RF switches, a first phase circuit that, by means of the first RF switch, is selectively connected between the second reception bandpass filter and the antenna terminal, a second phase circuit that, by means of the second RF switch, is selectively connected between the second reception bandpass filter and the antenna terminal, and a third phase circuit that, by means of the third RF switch, is selectively connected between the first reception bandpass filter and the antenna terminal, wherein the second transmission bandpass filter and the antenna terminal are selectively connected by means of the fourth RF switch, the first transmission bandpass filter and the antenna terminal are selectively connected by means of the fifth RF switch, and the baseband processor causes the RF frontend module to operate in an operating mode from among a first operating mode in which the third and fifth RF switches are switched on while the other RF switches are switched off, a second operating mode in which the first and fourth RF switches are switched on while the other RF switches are switched off, and a third operating mode in which the second, third, and fifth RF switches are switched on while the other RF switches are switched off.

(7) The mobile wireless device according to (6), wherein the first phase circuit is configured to block transmit signals passing through the second transmission bandpass filter from looping back into the receiving end, and the second phase circuit is configured to block transmit signals passing through the first transmission bandpass filter from looping back into the receiving end.

(8) The mobile wireless device according to (6) or (7), wherein the RF frontend module is further provided with a fourth phase circuit that, by means of the fourth RF switch, is selectively connected between the second transmission bandpass filter and the antenna terminal, and a fifth phase circuit that, by means of the fifth RF switch, is selectively connected between the first transmission bandpass filter and the antenna terminal.

(9) The mobile wireless device according to any of (6) to (8), wherein in the RF frontend module, two filters which have the same passband but different attenuation properties are included as the second reception bandpass filter, the two filters being respectively selected when used in combination with the corresponding first or second transmission bandpass filter.

(10) The mobile wireless device according to (9), wherein a specific reception bandpass filter, the phase circuit connected thereto, and its corresponding transmission bandpass filter are constructed with a duplexer, a single RF switch is provided with respect to the duplexer, and the single RF switch is shared between the relevant reception bandpass filter and transmission bandpass filter.

Although the foregoing describes a preferred embodiment, it is possible to perform various alterations or modifications other than those mentioned above. In other words, it is to be understood as obvious by persons skilled in the art that various modifications, combinations, and other embodiments may occur depending on design or other factors insofar as they are within the scope of the claims or their equivalents.

REFERENCE SIGNS LIST

10: RF switch unit
11a, 11b, 11c, 12, 12a, 12b, 12c, 13, 13a, 13b, 13c, 14 to 16: RF switch
20: diplexer
31 to 34: duplexer
41a, 41b, 41c, 42, 42a, 42b, 42c, 43, 43a, 43b, 43c, 44, 45, 46: phase circuit
50: RF frontend module
51, 51a, 51b, 52, 52a, 52b, 53 to 56: bandpass filter
60: antenna terminal
61 to 64: terminal (port terminal)
100, 100a, 100b, 100c, 100d, 100e, 100f, 100g: RF frontend module
101: antenna
200: transceiver
211 to 214: power amp
300: baseband processor
301: display
303: touch panel
305: speaker
309: memory
311: phase circuit
312, 313: bandpass filter

What is claimed is:

1. A wireless communication device comprising:
    circuitry configured to implement bandpass filters, the bandpass filters including:
        a first transmission bandpass filter that takes a first transmit frequency band as a passband;
        a second transmission bandpass filter that takes a second transmit frequency band as a passband;
        a first reception bandpass filter that takes a first receive frequency band as a passband; and
        a second reception bandpass filter that takes a second receive frequency band as a passband, wherein:
    the circuitry is further configured to implement:
        a plurality of switches, each switch connected to a respective single one of the bandpass filters; and
        a plurality of phase circuits, each phase circuit separately connected to one of the plurality of switches that is connected to the respective single one of the bandpass filters, such that each of the bandpass filters is selectively connected to an antenna terminal through one of the plurality of phase circuits; and
    the wireless communication device operates in different operating modes based on different on and off configurations of the plurality of switches.

2. The wireless communication device according to claim 1, wherein at least one of the reception bandpass filters is connected to two of the plurality of switches, and each switch selectively connects the at least one of the reception bandpass filters to the antenna terminal via a different phase circuit.

3. The wireless communication device according to claim 2, wherein each of the first reception bandpass filter and the second reception bandpass filter is connected to two of the plurality of switches, and each switch connected to the first reception bandpass filter and the second reception bandpass filter selectively connects its respective reception bandpass filter to the antenna terminal via a different phase circuit.

4. The wireless communication device according to claim 1, further comprising:
a third transmission bandpass filter that takes a third transmit frequency band as a passband; and
a third reception bandpass filter that takes a third receive frequency band as a passband.

5. The wireless communication device according to claim 4, wherein at least one of the reception bandpass filters is connected to three of the plurality of switches, and each switch selectively connects the at least one of the reception bandpass filters to the antenna terminal via a different phase circuit.

6. The wireless communication device according to claim 5, wherein
each of the first reception bandpass filter, the second reception bandpass filter, and the third reception bandpass filter is connected to three of the plurality of switches, and each switch connected to the first reception bandpass filter, the second reception bandpass filter, and the third reception bandpass filter selectively connects its respective reception bandpass filter to the antenna terminal via a different phase circuit.

7. The wireless communication device according to claim 4, wherein at least one of the reception bandpass filters is connected to two of the plurality of switches, and each switch selectively connects the at least one of the reception bandpass filters to the antenna terminal via a different phase circuit.

8. The wireless communication device according to claim 7, wherein
each of the first reception bandpass filter and the second reception bandpass filter, is connected to two of the plurality of switches, and each switch connected to the first reception bandpass filter and the second reception bandpass filter selectively connects its respective reception bandpass filter to the antenna terminal via a different phase circuit, and
the third reception bandpass filter is only connected to one of the plurality of switches, and the switch connected to the third reception bandpass filter selectively connects the third reception bandpass filter via only one phase circuit.

9. The wireless communication device according to claim 1, wherein one of the bandpass filters is selectively connected to a reception terminal by one of the plurality of switches.

10. The wireless communication device according to claim 1, further comprising:
a third reception bandpass filter that takes the first receive frequency band as a passband, and the first reception bandpass filter and the third reception bandpass filter are each selectively connected to a same reception terminal through a separate one of the plurality of switches, wherein the first reception bandpass filter and the third reception bandpass filter have different attenuation properties.

11. The wireless communication device according to claim 10, further comprising:
a fourth reception bandpass filter that takes the second receive frequency band as a passband, and the second reception bandpass filter and the fourth reception bandpass filter are each selectively connected to a same reception terminal through a separate one of the plurality of switches.

12. The wireless communication device according to claim 1, wherein the plurality of switches includes a first switch, a second switch, a third switch, a fourth switch, and a fifth switch, and the wireless communication device further comprising:
a first phase circuit, among the plurality of phase circuits, that, via the first switch, is selectively connected between the second reception bandpass filter and an antenna terminal,
a second phase circuit, among the plurality of phase circuits, that, via the second switch, is selectively connected between the second reception bandpass filter and the antenna terminal, and
a third phase circuit, among the plurality of phase circuits, that, via the third switch, is selectively connected between the first reception bandpass filter and the antenna terminal, wherein,
the second transmission bandpass filter and the antenna terminal are selectively connected by the fourth switch,
the first transmission bandpass filter and the antenna terminal are selectively connected by the fifth switch, and
the wireless communication device operates in an operating mode from among a first operating mode in which the third and fifth switches are switched on while other switches are switched off, a second operating mode in which the first and fourth switches are switched on while other switches are switched off, and a third operating mode in which the second, third, and fifth switches are switched on while other switches are switched off.

13. The wireless communication device according to claim 12, wherein the first phase circuit is configured to block transmit signals passing through the second transmission bandpass filter from looping back into the receiving end, and the second phase circuit is configured to block transmit signals passing through the first transmission bandpass filter from looping back into the receiving end.

14. The wireless communication device according to claim 12, further comprising:
a fourth phase circuit, among the plurality of phase circuits, that, via the fourth switch, is selectively connected between the second transmission bandpass filter and the antenna terminal, and
a fifth phase circuit, among the plurality of phase circuits, that, via the fifth switch, is selectively connected between the first transmission bandpass filter and the antenna terminal.

15. The wireless communication device according to claim 1, wherein one of the reception bandpass filters, a phase circuit connected thereto, and one of the transmission bandpass filters are included in a duplexer, a single switch is connected to the duplexer, and the single switch is shared between the reception bandpass filter and transmission bandpass filter of the duplexer.

16. A wireless communication apparatus comprising:
an antenna;
a wireless communication device connected to the antenna;
an RF transceiver that is connected to the wireless communication device, and includes a transmitter circuit and a receiver circuit, and conducts high-frequency signal transmit/receive processing; and
a baseband processor that is connected to the RF transceiver and conducts baseband processing, wherein the wireless communication device includes:
circuitry configured to implement bandpass filters, the bandpass filters including:
a first transmission bandpass filter that takes a first transmit frequency band as a passband, a second transmission bandpass filter that takes a second transmit frequency band as a passband, a first reception bandpass filter that takes a first receive frequency band as a passband, and a second reception bandpass filter that takes a second receive frequency band as a passband, wherein the circuitry is further configured to implement:

a plurality of switches, each switch connected to the respective single one of the bandpass filters, and a plurality of phase circuits, each phase circuit separately connected to one of the plurality of switches that is connected to a the respective single one of the bandpass filters, such that each of the bandpass filters is selectively connected to an antenna terminal through one of the plurality of phase circuits, and the wireless communication device operates in different operating modes based on different on and off configurations of the plurality of switches.

17. A wireless communication method, implemented by a wireless communication device, the wireless communication device including circuitry configured to implement a first transmission bandpass filter that takes a first transmit frequency band as a passband; a second transmission bandpass filter that takes a second transmit frequency band as a passband; a first reception bandpass filter that takes a first receive frequency band as a passband; a second reception bandpass filter that takes a second receive frequency band as a passband; and a first switch, a second switch, a third switch, a fourth switch, and a fifth switch, the method comprising:

selectively connecting a first phase circuit, via the first switch of the wireless communication device, between the second reception bandpass filter and an antenna terminal;

selectively connecting a second phase circuit that, via the second switch of the wireless communication device, between the second reception bandpass filter and the antenna terminal;

selectively connecting a third phase circuit, via the third switch of the wireless communication device, between the first reception bandpass filter and the antenna terminal;

selectively connecting the second transmission bandpass filter and the antenna terminal by the fourth switch;

selectively connecting the first transmission bandpass filter and the antenna terminal by the fifth switch; and operating in different operating modes based on different on and off configurations of the first through fifth switches.

18. The wireless communication method according to claim 17, further comprising:

setting the wireless communication apparatus to operate, wherein the wireless communication apparatus operates in an operating mode from among a first operating mode in which the third and fifth switches are switched on while other switches are switched off, a second operating mode in which the first and fourth switches are switched on while other switches are switched off, and a third operating mode in which the second, third, and fifth switches are switched on while other switches are switched off.

* * * * *